(12) United States Patent
Shiohara

(10) Patent No.: US 7,116,360 B2
(45) Date of Patent: Oct. 3, 2006

(54) IMAGE SIGNAL PROCESSING CIRCUIT AND SEMICONDUCTOR DEVICE

(75) Inventor: Ryuichi Shiohara, Matsumoto (JP)

(73) Assignee: Seiko Epson Corporation, (JP)

( * ) Notice: Subject to any disclaimer, the term of this patent is extended or adjusted under 35 U.S.C. 154(b) by 582 days.

(21) Appl. No.: 10/377,400

(22) Filed: Feb. 28, 2003

(65) Prior Publication Data

US 2003/0178645 A1 Sep. 25, 2003

(30) Foreign Application Priority Data

Feb. 28, 2002 (JP) ............................. 2002-053131

(51) Int. Cl.
*H04N 5/228* (2006.01)
(52) U.S. Cl. .................................. 348/222.1
(58) Field of Classification Search ............... None
See application file for complete search history.

(56) References Cited

U.S. PATENT DOCUMENTS

| 6,244,710 | B1 * | 6/2001 | Ogawa .................. 351/206 |
| 6,885,396 | B1 * | 4/2005 | Panicacci et al. .......... 348/241 |
| 2002/0130799 | A1 * | 9/2002 | Yang et al. .............. 341/138 |

FOREIGN PATENT DOCUMENTS

| JP | 03-169171 | 7/1991 |
| JP | 03-237821 | 10/1991 |
| JP | 04-212525 | 8/1992 |
| JP | 04-212575 | 8/1992 |
| JP | 05-207329 | 8/1993 |
| JP | 06-246558 | 6/1995 |
| JP | 08-172356 | 7/1996 |
| JP | 08-081674 | 11/1996 |
| JP | 10-224696 | 8/1998 |
| JP | 2001-024906 | 1/2001 |

OTHER PUBLICATIONS

Communication from Japanese Patent Office regarding related application.

* cited by examiner

*Primary Examiner*—Ngoc-Yen Vu
*Assistant Examiner*—Dillon Durnford-Geszvain
(74) *Attorney, Agent, or Firm*—Harness, Dickey & Pierce, P.L.C.

(57) ABSTRACT

An image signal processing circuit is provided that can narrow the bus width of a bus that outputs data. The circuit is equipped with resistances $R_1 \sim R_{511}$ that are serially connected between a first power supply potential $V_T$ and a second power supply potential $V_B$, comparators $C_1 \sim C_{511}$ having first inputs in which potentials $V_1 \sim V_{511}$ on terminal sections of the resistances $R_1 \sim R_{511}$ are input, respectively, and second inputs in which an analog image signal is input, and an encoder 42 that encodes output signals of the comparators $C_1 \sim C_{511}$ into unsigned integer numbers of 9-bit width and outputs the same as digital image data.

10 Claims, 17 Drawing Sheets

Analog image signal

IMAGE SIGNAL PROCESSING CIRCUIT AND SEMICONDUCTOR DEVICE

TECHNICAL FIELD

The present invention relates to an image signal processing circuit that receives an analog image signal and outputs digital image data. Moreover, the present invention relates to a semiconductor device using such an image signal processing circuit.

BACKGROUND

In recent years, digital still cameras and digital video cameras with over one million pixels have become widely used. These digital still cameras use a plurality of CCD image sensors, an area sensor having CMOS image sensors, and an A/D converter, and digitally convert output signals (analog image signals) of the area sensor by the A/D converter, to obtain digital image data. Further, since digital still cameras in recent years require an A/D conversion speed of about 20 MHz, flash type A/D converters, serial-parallel type A/D converters, pipeline type A/D converters and the like, which can perform A/D conversions at high speeds, are often used.

FIG. 15 shows an example of a conventional circuit (digital image photographing circuit) that images digital pictures. As shown in FIG. 15, the digital image photographing circuit 80 is equipped with an area sensor 81, a CDS circuit 84, and a pipeline type A/D converter 85. Also, the area sensor 81 includes a sensor section 82 and a data accumulation section 83, wherein the sensor section 82 includes image sensors disposed in a matrix configuration.

The image sensors within the sensor section 82 output analog image signals according to the amount of received light to the data accumulation section 83. More specifically, each of the image sensors in the sensor section 82 outputs (Vb) V when it receives the minimum amount of light within the range of its light sensing capability, outputs (Vt) V when it receives the maximum amount of light within the range of its light sensing capability, and linearly outputs a potential between (Vb) V and (Vt) V according to the amount of light received when it receives an amount of light between the two. It is noted that the potential difference between (Vb) V and (Vt) V is about 0.6~0.8 V.

The data accumulation section 83 amplifies the analog image signal received from the sensor section 82 with a predetermined amplification, records the same as a signal having an amplitude ranging between $(V_B)$ V and $(V_T)$ V, and serially outputs the same to the CDS circuit 84. It is noted that the potential difference between $(V_B)$ V and $(V_T)$ V is about 2 V.

The CDS circuit 8 removes noise components from the analog image signals serially output from the data accumulation section 83, and serially outputs the same to the A/D converter 85.

The A/D converter 85 receives the analog image signal from the CDS circuit 84, and outputs an unsigned integer value having a width of 10 bits (digital image data). More specifically, the A/D converter 85 outputs zero (0) when it receives an analog image signal at $(V_B)$ V, outputs 1023 when it receives an analog image signal at $(V_T)$ V, and linearly outputs a value between 0 and 1023 according to a potential received when the received potential is between the two.

FIG. 16 is a graph showing the relation (A/D conversion characteristic) between analog image signals received and digital image data output by the A/D converter 85. In FIG. 16, values of analog image signals received by the A/D converter 85 are indicated along a transverse axis, and values of digital image data output by the A/D converter 85 along a vertical axis.

In general, a digital image data accuracy to at least about 10 bits to 12 bits is required to secure the gradation of an image, and therefore the width of a bus that connects an output of the A/D converter 85 and an image processing circuit in a succeeding stage needs to be broadened, and a large capacity image memory is required to record digital image data.

Also, there is a trend to increase the number of pixels in area sensors, and therefore faster A/D converters (about 20 MHz~50 MHz) are in demand for taking in the entire image in a shorter time. As a result, pipeline type A/D converters that take in images at high speeds are required. However, although a pipeline type A/D converter with multiple bits is fast and highly accurate, it is a large circuit, expensive and consumes a lot of power. Also, securing the accuracy of a multiple-bit circuit may be problematic. For these reasons, column type A/D converters, which have a smaller circuit and require a lower power consumption than flash type A/D converters, serial-parallel type A/D converters or pipeline type A/D converters, are also used. FIG. 17 shows an example of a semiconductor device using a column type A/D converter. As indicated in FIG. 17, the semiconductor device 90 is equipped with an area sensor 91 having image sensors disposed in a matrix configuration, and a column type A/D converter 92 that receives analog image signals from the area sensor 91 and outputs digital image data of 10-bit width.

When the column type A/D converter is used, as indicated in FIG. 17, the area sensor and the column type A/D converter can be integrated into a single semiconductor device. However, in order to achieve a highly accurate A/D conversion with a column type A/D converter, the cycle of sweep signals in ramps needs to be made longer, which is problematic because A/D conversion takes a long time.

To reduce the memory capacity necessary for the digital expression of a picture, Japanese laid-open patent publication (Tokkai) Hei 8-294086 (hereafter also referred to as "Reference 1") describes a compression method that compresses a digital input expression in first predetermined bits representing a picture in a digital output expression in second predetermined bits representing the picture. The compression method includes the steps of: (a) determining a logarithmic function for converting a digital input in first predetermined bits into a digital output in second predetermined bits; (b) replacing a part of the logarithmic function with a polynomial function; and (c) compressing the digital input in first predetermined bits into the digital output in second predetermined bits through a processor by using the logarithmic function and the polynomial function to thereby reduce the memory capacity necessary for storing the picture.

However, although the compression method described in Reference 1 can reduce the memory capacity for storing pictures, it needs a much higher accuracy in its A/D converter, and also needs a circuit that includes a large capacity memory called a look-up table. Also, in the compression method described in Reference 1, because a part of the logarithmic function is replaced with a polynomial function, a knee characteristic cannot be realized.

Also, Tokkai Hei 7-162886 (hereafter also referred to as "Reference 2") describes a method for performing a film-like compression on a video signal. The video signal film-like compression method includes the steps of: (a) supplying a video signal to a compression means; and (b) film-like compressing the video signal within the compression means in accordance with a film-like compression function and generating a compressed video signal from the video signal.

However, the video signal film-like compression method described in Reference 2 processes a video signal in a manner to incorporate a film-like compression characteristic into the video signal, and does not narrow the bit width of a digital image or the bus width, or realize a knee characteristic.

In view of the problems described above, it is a first object of the present invention to provide an image signal processing circuit that can narrow the bus width of a bus that outputs digital image data, realize a knee characteristic, record digital image data having a great dynamic range with a small memory, and realize a lower power consumption with a simple and low cost circuit while reserving a dynamic range and accuracy necessary for image data. Furthermore, it is a second object of the present invention to provide a semiconductor device that includes such an image signal processing circuit.

SUMMARY

To solve the problems described above, an image signal processing circuit in accordance with the present invention converts an analog image signal to digital image data, wherein the circuit outputs, in response to an analog image signal, digital image data having values that change in a polyline with respect to changes in the analog image signal.

Here, the image signal processing circuit may include an A/D conversion section that outputs, in response to an analog image signal, digital image data having values that change in a polyline with respect to changes in the analog image signal.

Further, an image signal processing circuit may include an A/D conversion section that outputs, in response to an analog image signal, first digital data of i-bit (i is a natural number) having values that linearly change with respect to changes in the analog image signal, and a data conversion section that outputs, in response to the first digital data, second digital data of j-bit (j is a natural number that is less than i) which changes in a polyline with respect to changes in the first digital data. Here, the first digital data may have a width of 8~16 bits, and the second digital data may have a width of 7~12 bits. Also, a rate of the changes of the second digital data with respect to the changes of the first digital data may be expressed by $1/2^k$ (k is a natural number).

Further, a semiconductor device in accordance with the present invention photographs an image and outputs digital image data, and the semiconductor device includes an area sensor having a plurality of image sensors that each output an analog image signal according to the amount of light received, and an image signal processing circuit described above that converts an analog image signal to digital image data.

Here, the image sensors may be image sensors formed on a common chip by a CMOS type manufacturing process. Also, the image sensors may be disposed in a matrix configuration.

The invention can narrow the bus width of a bus that outputs digital image data, realize a knee characteristic, record digital image data having a great dynamic range with a small memory, and realize a lower power consumption with a simple and low cost circuit while maintaining a dynamic range and accuracy necessary for image data.

DETAILED DESCRIPTION

Embodiments of the present invention will be described with reference to the accompanying drawings. It is noted that the same components will be indicated with the same reference numbers, and their description will not be duplicated.

Figure 1:
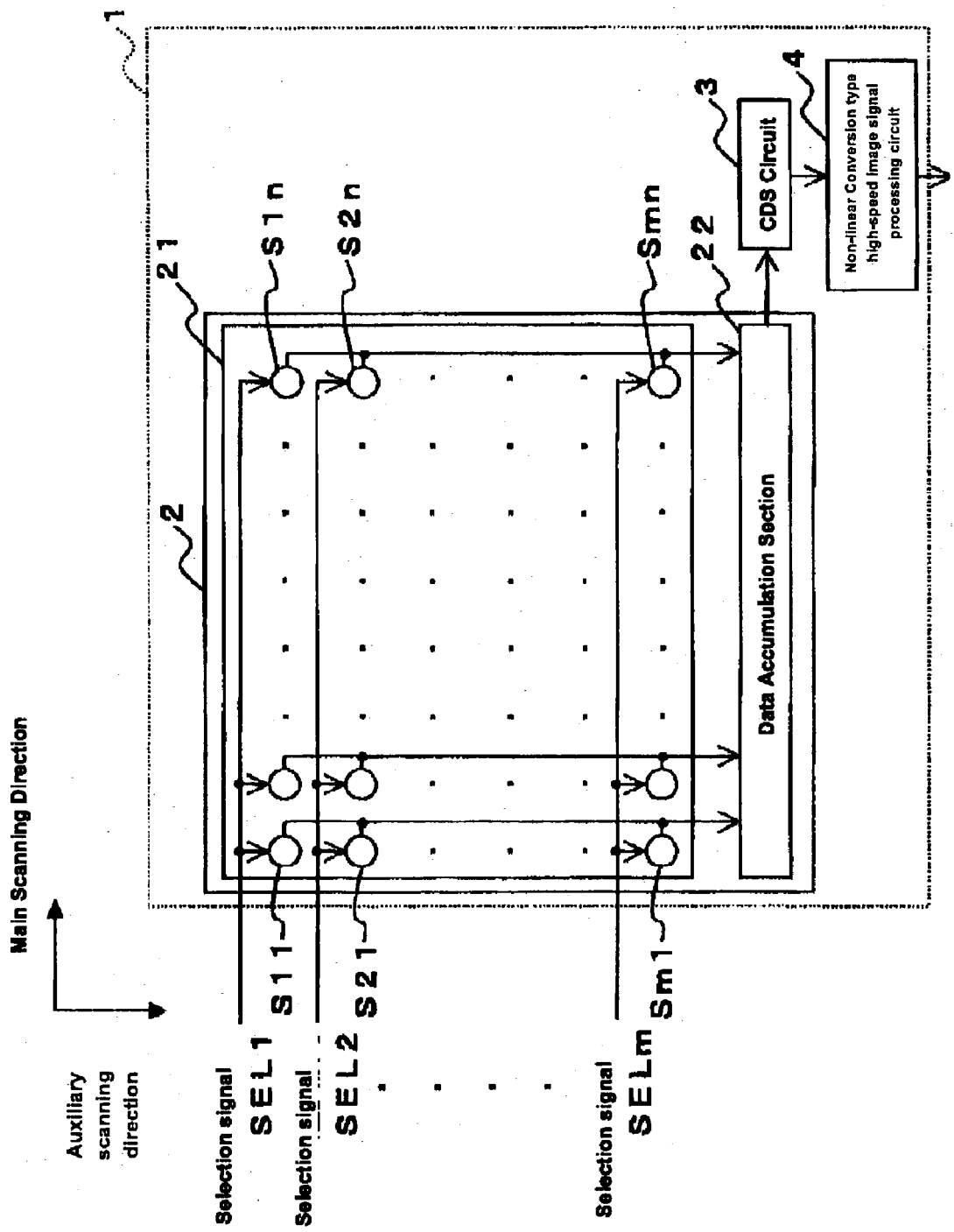
FIG. 1 shows an outline of a semiconductor device in accordance with an embodiment of the present invention.

FIG. 1 schematically shows a semiconductor device in accordance with one embodiment of the present invention. As indicated in FIG. 1, the semiconductor device 1 is equipped with an area sensor 2, a CDS circuit 3, and a non-linear conversion type high-speed image signal conversion circuit 4 in accordance with a first embodiment of the present invention. Also, the area sensor 2 includes a sensor section 21 and a data accumulation section 22.

As indicated in FIG. 1, the sensor section 21 of the area sensor 2 includes (m×n) CMOS type image sensors S11~Smn disposed in a matrix configuration in m rows in an auxiliary scanning direction (common direction) and n columns in a main scanning direction (segment direction). Selection signals SEL1~SELm are successively input in each row of the image sensors S11~Smn within the area sensor 2, and each of the image sensors S11~Smn, when a selection signal is input, outputs an analog image signal according to the amount of received light to the data accumulation section 22. More specifically, each of the image sensors S11~Smn outputs (Vb) V when it receives the minimum amount of light within the range of its light sensing capability, outputs (Vt) V when it receives the maximum amount of light within the range of its light sensing capability, and linearly outputs a potential between (Vb) V and (Vt) V according to the amount of light received when it receives an amount of light between the two. It is noted that the potential difference between (Vb) V and (Vt) V is about 0.6~0.8 V.

The data accumulation section 22 amplifies the analog image signal received from the sensor section 21 with a predetermined amplification, records the same as a signal having an amplitude ranging between $(V_B)$ V and $(V_T)$ V, and serially outputs the same to the CDS circuit 3. It is noted that the potential difference between $(V_B)$ V and $(V_T)$ V is about 2 V.

The CDS circuit 3 removes noise components from the analog image signals serially output from the data accumulation section 22, and serially outputs the same to the A/D converter 4.

It is desirous for digital image data to have a wide dynamic range and gradation in view of the dynamic range and accuracy of gradation of a picture. However, in view of the characteristics of a picture, the following can be said with respect to the dynamic range and accuracy of gradation. A darker side and a brighter side only need to have a dynamic range at about the same level with respect to an intermediate density as the center, and a darker side and a brighter side only need to have a gradation accuracy at about the same level with respect to an intermediate density as the center. This means that the accuracy of digital image data may be sufficient if both of the darker side and brighter side have a similar logarithmic accuracy with respect to the intermediate density as the center.

In general, it is known by experiment that an intermediate density of a picture may preferably be set at an index of reflection of about 18% (=0.18). This can also be readily presumed by the following:

$$\text{Log}_2 (0.18) = -2.47 \ldots \quad (1),$$

$$\text{Log}_2 (1) = 0 \ldots \quad (2), \text{ and}$$

$$\text{Log}_2 (\tfrac{1}{32}) = -5 \ldots \quad (3)$$

Therefore, in view of the dynamic range, the above can be readily presumed by the fact that the gradation range of $\tfrac{1}{32}\%\sim 18\%$ (−2.47−(−5)=2.53) and the gradation range of 18%~100% (0−(−2.47)=2.47) are about 2.5, which are generally the same. Accordingly, it is sufficient if gradation accuracy for recording brightness below 18% and that for brightness over 18% are at about the same level in view of recording data information. This means that, when a 10-bit digital image data has a dark part of 0 and a light part of 1023, and it is recorded with an image gradation accuracy of a 1-bit step, the dark part needs a fine step accuracy, but the light part does not need a step accuracy as high as that of the dark part.

Furthermore, as a method of reproducing a dynamic range of a picture in image data in accordance with human visibility characteristics, a knee characteristic may be implemented in the image data, which enables storing image data having a great dynamic range. In other words, the human eye can discriminate delicate gradations that change from black to gray to white, and also to some degree a great change from white to whiter to an extremely bright luminance, but has a relatively poor ability for this type of great change. Although an accuracy may not be required due to such a visibility characteristic, recording parts with white, whiter and bright white increases the dynamic range. The knee characteristic no longer provides a linear data implementation, but is effective in implementing a broader dynamic range.

Figure 2:
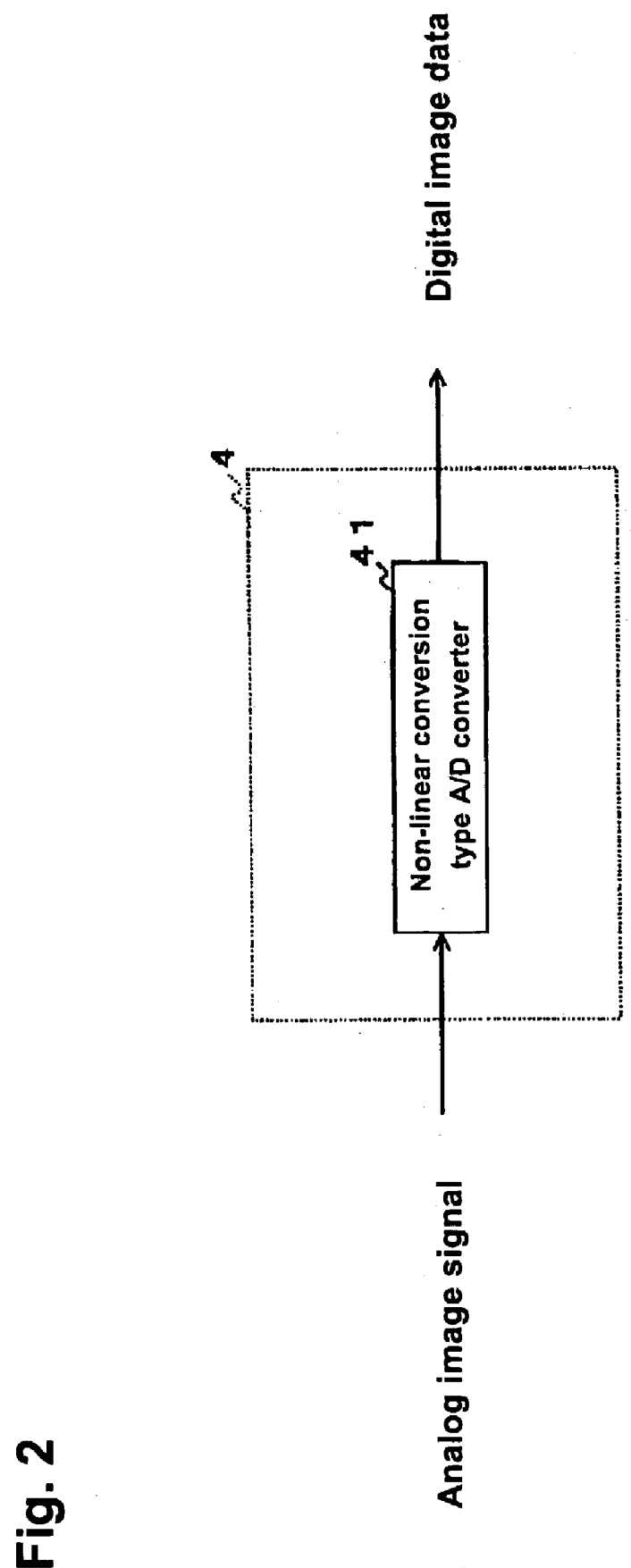
FIG. 2 shows an image signal processing circuit in accordance with a first embodiment of the present invention.
Figure 3:
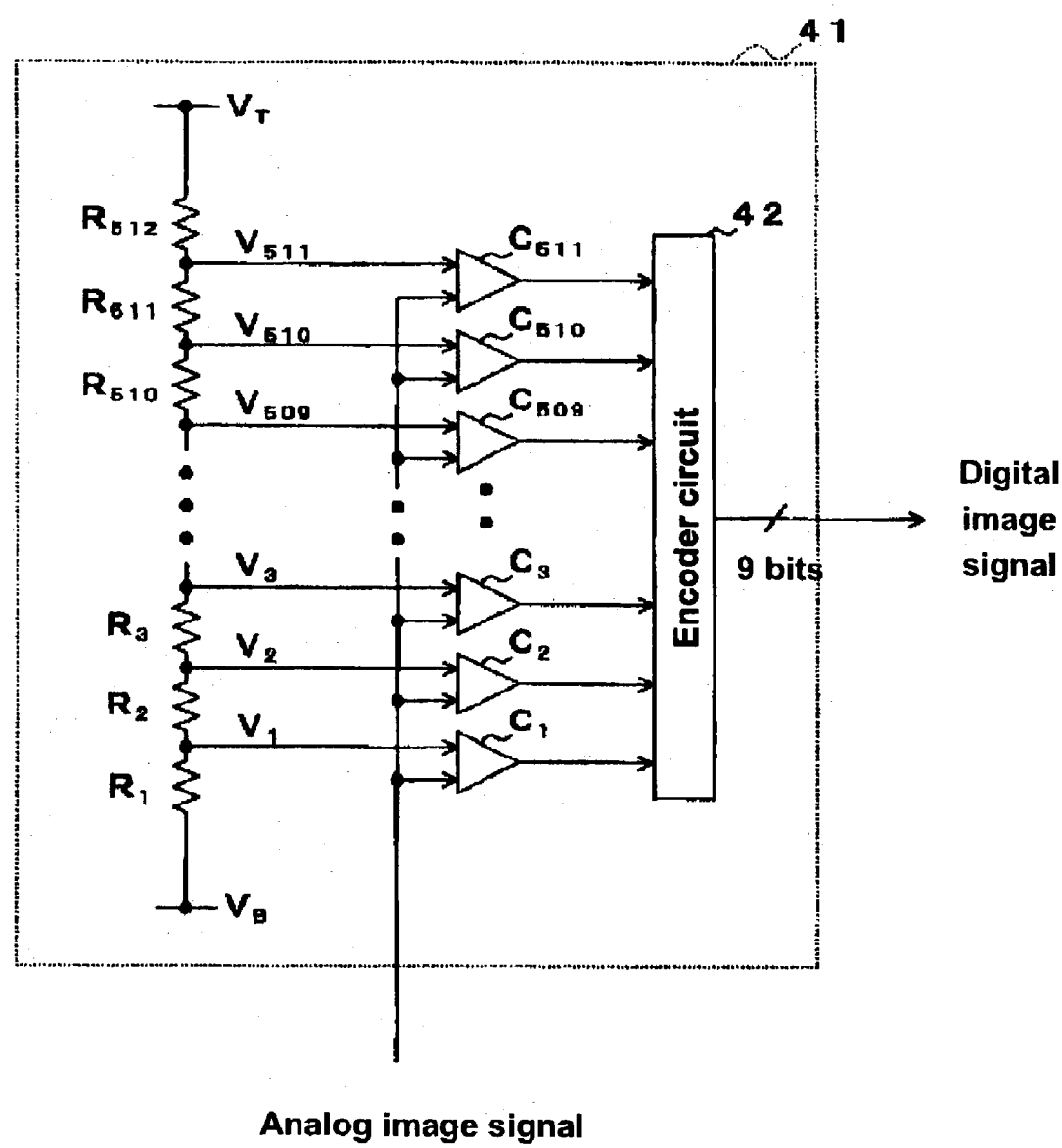
FIG. 3 shows a first specific example of a circuit structure of a non-linear conversion type A/D converter shown in FIG. 2.

FIG. 2 shows an internal composition of the non-linear conversion type high-speed image signal conversion circuit 4 of FIG. 1 as an image signal processing circuit in accordance with a first embodiment of the present invention. The non-linear conversion type high-speed image signal conversion circuit 4 is based on the aspects described above. As indicated in FIG. 2, the non-linear conversion type high-speed image signal conversion circuit 4 includes a non-linear conversion type A/D converter 41. FIG. 3 shows a first specific example of a circuit structure of the non-linear conversion type A/D converter 41.

As shown in FIG. 3, the non-linear conversion type A/D converter 41 includes 512 resistances $R_1\sim R_{512}$ serially connected between a first power supply potential $V_T$ and a second power supply potential $V_B$. A resistance value of each of the resistances $R_1\sim R_{255}$ is $(R_A)$ Ω, a resistance value of each of the resistances $R_{256}\sim R_{383}$ is $(2R_A)$ Ω, and a resistance value of each of the resistances $R_{384}\sim R_{512}$ is $(4R_A)$ Ω. When potentials on terminal sections of the respective resistances $R_1\sim R_{512}$ are $V_1\sim V_{511}$, and a potential difference between $V_{255}$ and $V_B$ is $(255V_A)$ V, a potential difference between $V_{255}$ and $V_{383}$ is $(256V_A)$V, and a potential difference between $V_{383}$ and $V_{511}$ is $(512V_A)$V. These potential differences $V_1$ $(=V_A)\sim V_{511}$ $(=1023 V_A)$ are input in first inputs of 511 comparators $C_1\sim C_{511}$, respectively.

In the meantime, an analog image signal $(V_{in})$ that is output from the CDS circuit 3 is input in second inputs of the comparators $C_1\sim C_{511}$. Each of the comparators $C_1\sim C_{511}$ outputs a signal at a high level when the analog image signal $(V_{in})$ is higher than or equal to the first input potential, and outputs a signal at a low level when the analog image signal $(V_{in})$ is lower than the first input potential. In other words, an output of a comparator Ci (I=1~511) is 1 when $V_{in} \geq V_k$, and 0 when $V_{in} < V_k$. Output signals of the comparators $C_1\sim C_{511}$ are input in an encoder circuit 42, and the encoder circuit 42 encodes the 511 signals into unsigned integer numbers of 9-bit width (when all of the outputs of the comparators $C_1\sim C_{511}$ are 0, it outputs 000000000 (0), and when all of the outputs are 1, it outputs 111111111 (511)), and outputs them as digital image data.

Figure 4:
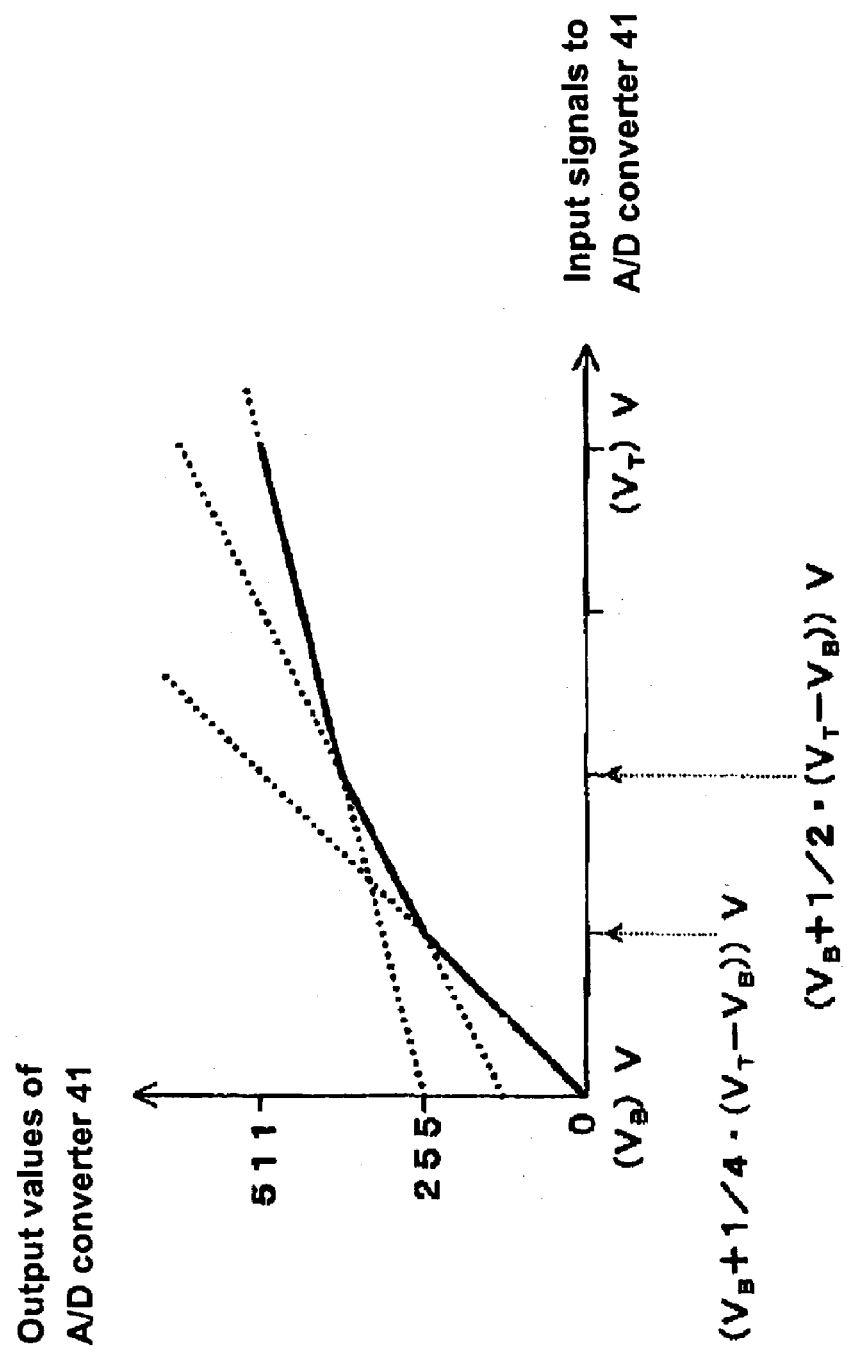
FIG. 4 is a graph showing an A/D conversion characteristic of the non-linear conversion type A/D converter shown in FIG. 3.

FIG. 4 is a graph showing an A/D conversion characteristic of the non-linear conversion type A/D converter 41 shown in FIG. 3. As indicated in FIG. 4, the non-linear conversion type A/D converter 41 outputs 0~255 in equal voltage steps for inputs of $(V_B)$ V~$(V_B+\tfrac{1}{4}\cdot(V_T-V_B))$ V, outputs 256~383 in equal voltage steps for inputs of $(V_B+\tfrac{1}{4}\cdot(V_T-V_B))$ V~$(V_B+\tfrac{1}{2}\cdot(V_T-V_B))$ V, and outputs 384~511 in equal voltage steps for inputs of $(V_B+\tfrac{1}{2}\cdot(V_T-V_B))$ V~$(V_T)$ V.

The non-linear conversion type A/D converter 41 indicated in FIG. 3 has a circuit structure that is similar to a circuit structure of a conventional flash type A/D converter that performs linear A/D conversions. However, in the conventional flash type A/D converter, a plurality of resistances having the same resistance value are serially connected between the first power supply potential and the second power supply potential, and potentials on terminal sections of these resistances change linearly. Accordingly, in the conventional flash type A/D converter, the linear potentials and an input signal are compared, and the A/D conversion characteristic becomes linear. In contrast, in the non-linear conversion type A/D converter 41, the resistances $R_1$~$R_{255}$ each having a resistance value of $(R_A)$ Ω, the resistances $R_{256}$~$R_{383}$ each having a resistance value of $(2R_A)$ Ω, and the resistances $R_{384}$~$R_{512}$ each having a resistance value of $(4R_A)$ Ω are serially connected between the first power supply potential $V_T$ and the second power supply potential $V_B$, such that potentials $V_1$~$V_{511}$ on the terminal sections of the resistances $R_1$~$R_{512}$ change in a polyline. Accordingly, in the non-linear conversion type A/D converter 41 indicated in FIG. 3, potentials that change in a polyline are compared with analog image signals by the comparators $C_1$~$C_{511}$, and therefore the A/D conversion characteristic assumes a polyline. As used herein, polyline means a series of end-connected straight line segments.

As described above, by the non-linear conversion type A/D converter 41 indicated in FIG. 3, when digitizing an analog image signal, image gradation information data, which may otherwise be recorded in 10-bits in the conventional art, can be converted into digital image data having a 9-bit width and output while maintaining its dynamic range. Also, the bus width that outputs digital image data can be narrowed, a useful knee characteristic in recording image gradations can be realized, digital image data having a great dynamic range can be recorded with a small memory, and recording can be made while maintaining a dynamic range and accuracy necessary for digital image data.

Figure 5:
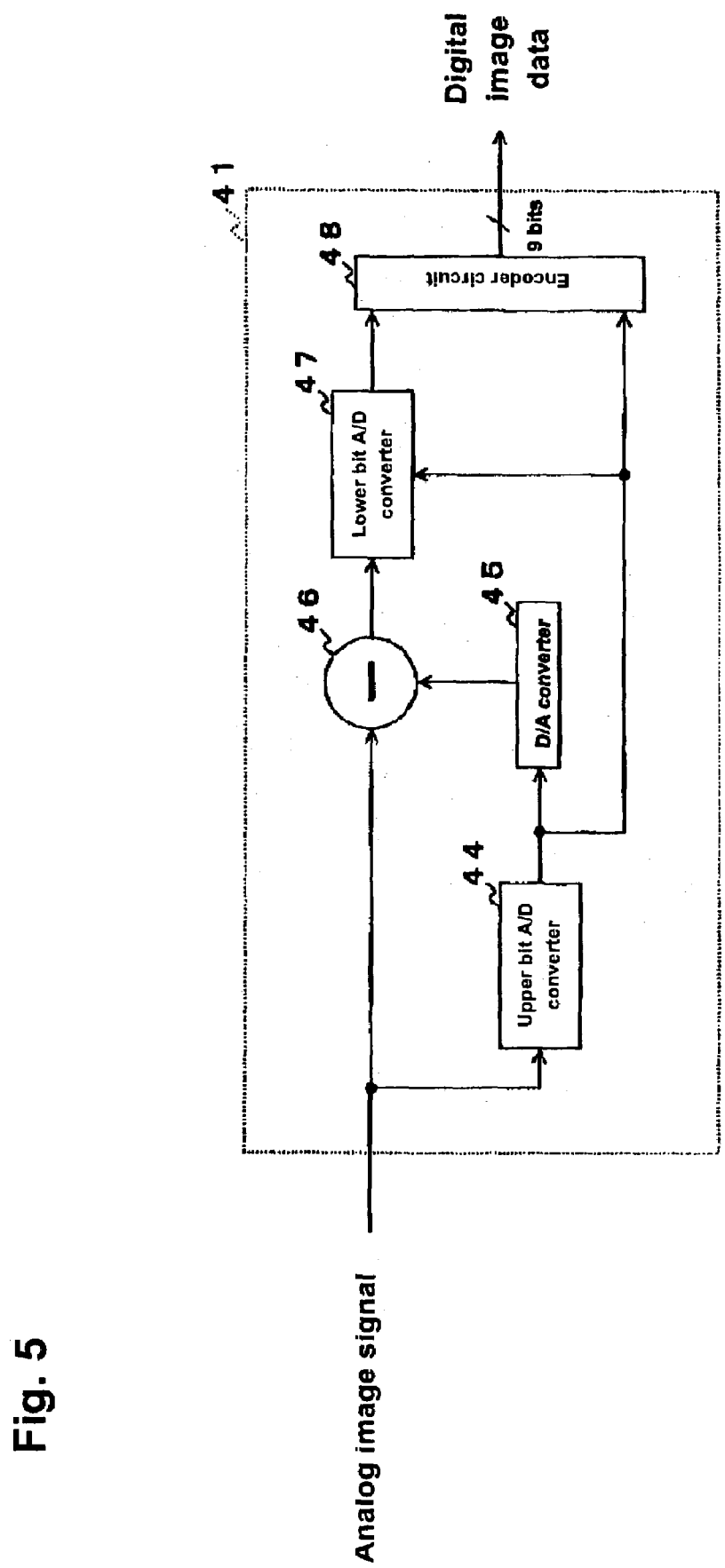
FIG. 5 shows a second specific example of a circuit structure of the non-linear conversion type A/D converter shown in FIG. 2.

FIG. 5 shows a second specific example of a circuit structure of the non-linear conversion type A/D converter 41. A flash type A/D converter has a little problem in that, although it operates at a high speed, it has a large circuit size because it handles many signal potentials that are resistance-divided, and has a large power consumption. The second specific example of a circuit structure of the non-linear conversion type A/D converter 41 shown in FIG. 5 is provided to solve such a problem.

As indicated in FIG. 5, the non-linear conversion type A/D converter 41 includes an upper bit A/D converter 44, a D/A converter 45, a signal differential output circuit 46, a lower bit A/D converter 47 and an encoder 48.

The upper bit A/D converter 44 has a structure similar to that of the non-linear conversion type flash type A/D converter shown in FIG. 3, and includes resistances having resistance values of $(R_A)$ Ω, $(R_A)$ Ω, $(2R_A)$ Ω and $(4R_A)$ Ω that are serially connected. As a result, it outputs data of 2-bit width "00" when an analog image signal is $(V_B)$ V~$(V_B+\frac{1}{8}\cdot(V_T-V_B))$ V, outputs data of 2-bit width "01" when an analog image signal is $(V_B+\frac{1}{8}\cdot(V_T-V_B))$ V~$(V_B+\frac{1}{4}\cdot(V_T-V_B))$ V, outputs data of 2-bit width "10" when an analog image signal is $(V_B+\frac{1}{4}\cdot(V_T-V_B))$ V~$(V_B+\frac{1}{2}\cdot(V_T-V_B))$ V, and outputs data of 2-bit width "11" when an analog image signal is $(V_B+\frac{1}{2}\cdot(V_T-V_B))$ V~$(V_T)$ V. In other words, the upper bit A/D converter 44 divides $(V_B)$ V~$(V_T)$ V by the four sets of resistances $(R_A)$ Ω, $(R_A)$ Ω, $(2R_A)$ Ω and $(4R_A)$ Ω into four areas, and determines in which of the four areas an analog signal is located.

The D/A converter 45 outputs a signal of $(V_B)$ V when an output of the upper bit A/D converter 44 is "00", outputs a signal of $(V_B+\frac{1}{8}\cdot(V_T-V_B))$ V when an output of the upper bit A/D converter 44 is "01", outputs a signal of $(V_B+\frac{1}{4}\cdot(V_T-V_B))$ V when an output of the upper bit A/D converter 44 is "10", and outputs a signal of $(V_B+\frac{1}{2}\cdot(V_T-V_B))$ V when an output of the upper bit A/D converter 44 is "11".

The signal differential output circuit 46 outputs a signal corresponding to a difference obtained by subtracting an output signal of the D/A converter 45 from an analog image signal.

The lower bit A/D converter 47 is a flash type linear A/D converter, and includes 128 resistances each having the same resistance value connected in series, wherein a structure similar to the one shown in FIG. 3 generates equal potentials in 127 steps at terminal points of the respective resistances, the potentials are compared with an output of the signal differential output circuit 46 and output by 127 comparators, and an encoder circuit converts them into data of the lower 7 bits and outputs the same. Here, a lower voltage applied to the 128 resistances within the lower bit A/D converter 47 is $V_{RB}$ (=VB), and an upper voltage is $V_{RT}$. A circuit that converts voltages with the conversion output results of 2 bits provided by the upper A/D converter 44 is built in the lower bit A/D converter 47, and the upper voltage $V_{RT}$ is varied by this circuit. When an output of the upper bit A/D converter 44 is "00" or "01", $V_{RT}=(V_B+\frac{1}{8}\cdot(V_T-V_B))$ V; when an output of the upper bit A/D converter 44 is "10", $V_{RT}=(V_B+\frac{1}{4}\cdot(V_T-V_B))$ V; and when an output of the upper bit A/D converter 44 is "11", $V_{RT}=(V_B+\frac{1}{2}\cdot(V_T-V_B))$ V. As such, depending on whether an output of the upper bit A/D converter 44 is "00", "01", "10" or "11", a signal output from the signal differential output circuit 46 is linearly A/D converted and output as data of the lower 7 bits. It is noted that, although not shown in FIG. 5, a circuit that multiples output potentials $V_{RB}$ and $V_{RT}$ at predetermined multiplications (two times, four times, etc.), respectively, may be provided to realize a similar function as described above. As a result, the conversion accuracy at the lower bit A/D converter 47 can be improved.

The encoder 48 outputs digital image data having a 9-bit data width including the upper 2 bits output from the upper A/D converter 44 and lower 7 bits output from the lower bit A/D converter 47.

By this circuit structure, the non-linear conversion type A/D converter 41 shown in FIG. 5 has an A/D conversion characteristic indicated in FIG. 4.

The circuit structure of the non-linear conversion type A/D converter 41 shown in FIG. 5 is similar to the structure of a conventional serial-parallel A/D converter that performs linear A/D conversions. However, in the conventional serial-parallel A/D converter, an upper bit A/D converter linearly converts an analog image signal, and a lower bit A/D converter compares step potentials having a constant potential difference with an output signal of a signal differential output circuit without depending on an output of the upper bit A/D converter and linearly converts the output signal of the signal differential output circuit. Accordingly, the conventional serial-parallel type A/D converter has a linear A/D conversion characteristic. In contrast, in the non-linear conversion type A/D converter 41 shown in FIG. 5, the upper bit A/D converter 44 converts analog image signals in a polyline, and the lower bit A/D converter 47 compares step potentials in 127 steps having a potential difference that changes according to an output of the upper bit A/D converter 44 with an output signal of the signal differential output circuit 46, and linearly converts the output signal of the signal differential output circuit 46. Accordingly, the non-linear conversion type A/D converter 41 shown in FIG. 5 has an A/D conversion characteristic in a polyline, and has a characteristic indicated in FIG. 4.

As described above, by the non-linear conversion type A/D converter 41 shown in FIG. 5, when digitizing an analog image signal, image gradation information data, which may otherwise be recorded in 10-bits in the conventional art, can be converted into digital image data having a 9-bit width and output while maintaining its necessary dynamic range and necessary gradation accuracy. Also, the bus width that outputs digital image data can be narrowed, a useful knee characteristic in recording image gradations can be realized, digital image data having a great dynamic range can be recorded with a small memory, and recording can be made while maintaining a dynamic range and accuracy necessary for digital image data.

Figure 6:
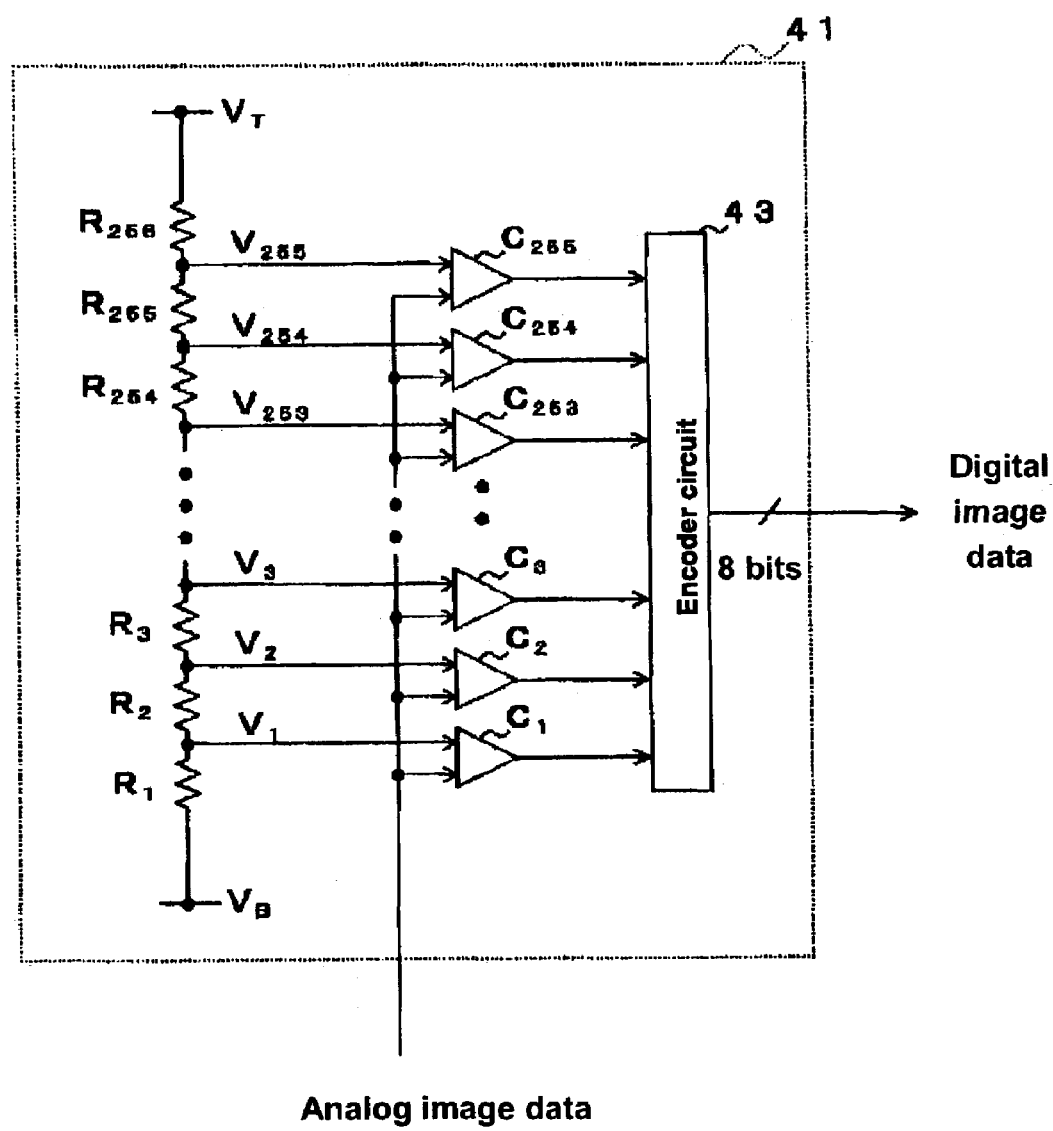
FIG. 6 shows a third specific example of a circuit structure of the non-linear conversion type A/D converter shown in FIG. 2.

FIG. 6 shows a third specific example of a circuit structure of the non-linear conversion type A/D converter 41.

As shown in FIG. 6, the non-linear conversion type A/D converter 41 includes 256 resistances $R_1$~$R_{256}$ serially connected between a first power supply potential $V_T$ and a second power supply potential $V_B$. A resistance value of each of the resistances $R_1$~$R_{27}$ is $(R_A)$ Ω, a resistance value of each of the resistances $R_{128}$~$R_{191}$ is $(2R_A)$ Ω, and a resistance value of each of the resistances $R_{192}$~$R_{223}$ is $(8R_A)$ Ω. Accordingly, when each potential difference between potentials $V_1$~$V_{127}$ on terminal sections of the respective resistances $R_1$~$R_{127}$ is $(V_A)$ V, each potential difference between potentials $V_{128}$~$V_{191}$ on terminal sections of the respective resistances $R_{128}$~$R_{191}$ is $(2V_A)$ V, each potential difference between potentials $V_{192}$~$V_{223}$ on terminal sections of the respective resistances $R_{192}$~$R_{223}$ is $(8V_A)$ V, and each potential difference between potentials $V_{224}$~$V255$ on terminal sections of the respective resistances $R_{224}$~$R_{255}$ is $(16V_A)$ V. These potential differences $V_1$~$V_{255}$ are input in first inputs of 255 comparators $C_1$~$C_{255}$, respectively.

In the meantime, an analog image signal that is output from the CDS circuit 3 is input in second inputs of the comparators $C_1$~$C_{255}$. Each of the comparators $C_1$~$C_{255}$ outputs a signal at a low level when the first input potential is higher than a potential of the analog image signal, and outputs a signal at a high level when the first input potential is lower than the potential of the analog image signal. Output signals of the comparators $C_1$~$C_{255}$ are input in an encoder circuit 43, and the encoder circuit 43 encodes the 255 signals into unsigned integer numbers of 8-bit width, and outputs them as digital image data.

Figure 7:
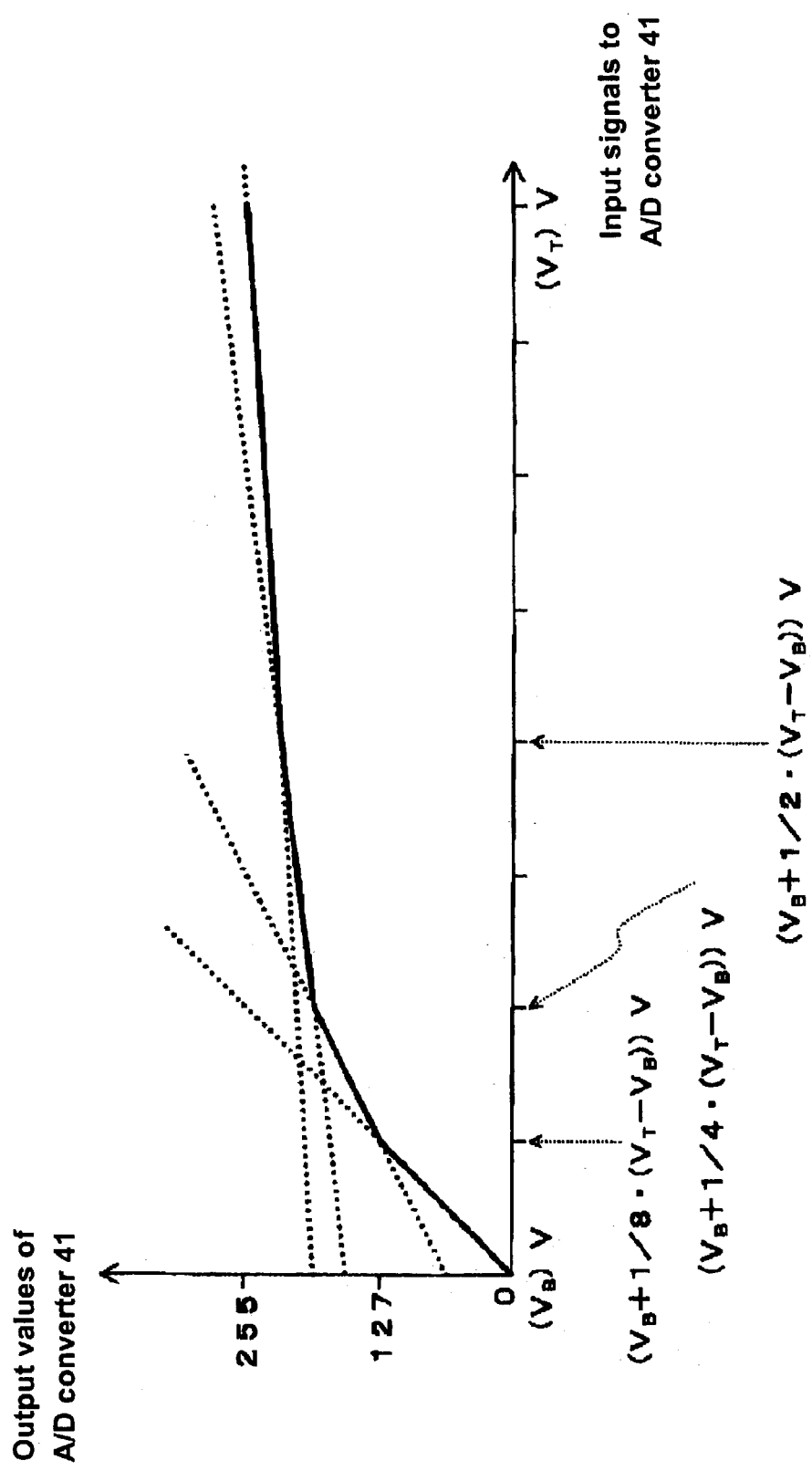
FIG. 7 is a graph showing an A/D conversion characteristic of the non-linear conversion type A/D converter shown in FIG. 6.

FIG. 7 is a graph showing an A/D conversion characteristic of the non-linear conversion type A/D converter 41 shown in FIG. 6. As indicated in FIG. 7, the non-linear conversion type A/D converter 41 outputs 0~127 in equal voltage steps for inputs of $(V_B)$ V~$(V_B+\frac{1}{8} \cdot (V_T-V_B))$ V, outputs 128~191 in equal voltage steps for inputs of $(V_B+\frac{1}{8} \cdot (V_T-V_B))$ V~$(V_B+\frac{1}{4} \cdot (V_T-V_B))$ V, and outputs 192~223 in equal voltage steps for inputs of $(V_B+\frac{1}{4} \cdot (V_T-V_B))$ V~$(V_B+\frac{1}{2} \cdot (V_T-V_B))$ V, and outputs 224~255 in equal voltage steps for inputs of $(V_B+\frac{1}{2} \cdot (V_T-V_B))$ V~$(V_T)$ V.

The non-linear conversion type A/D converter 41 shown in FIG. 6 has a circuit structure that is similar to a circuit structure of a conventional flash type A/D converter that performs linear A/D conversions. However, in the non-linear conversion type A/D converter 41, the resistances $R_1$~$R_{127}$ each having a resistance value of $(R_A)$ Ω, the resistances $R_{128}$~$R_{191}$ each having a resistance value of $(2R_A)$ Ω, the resistances $R_{192}$~$R_{223}$ each having a resistance value of $(8R_A)$ Ω, and the resistances $R_{224}$~$R_{255}$ each having a resistance value of $(16R_A)$ Ω are serially connected between the first power supply potential $V_T$ and the second power supply potential $V_B$, such that potentials $V_1$~$V_{255}$ on the terminal sections of the resistances $R_1$~$R_{255}$ change in a polyline. Accordingly, in the non-linear conversion type A/D converter 41 indicated in FIG. 6, potentials that change in a polyline are compared with analog image signals by the comparators $C_1$~$C_{255}$, and therefore the A/D conversion characteristic assumes a polyline.

As described above, by the non-linear conversion type A/D converter 41 shown in FIG. 6, when digitizing an analog image signal, image gradation information data, which may otherwise be recorded in 10-bits in the conventional art, can be converted into digital image data having an 8-bit width and output while maintaining its necessary dynamic range and necessary gradation accuracy. Also, the bus width that outputs digital image data can be narrowed, a useful knee characteristic in recording image gradations can be realized, digital image data having a great dynamic range can be recorded with a small memory, and recording can be made while maintaining a dynamic range and accuracy necessary for digital image data.

Figure 8:
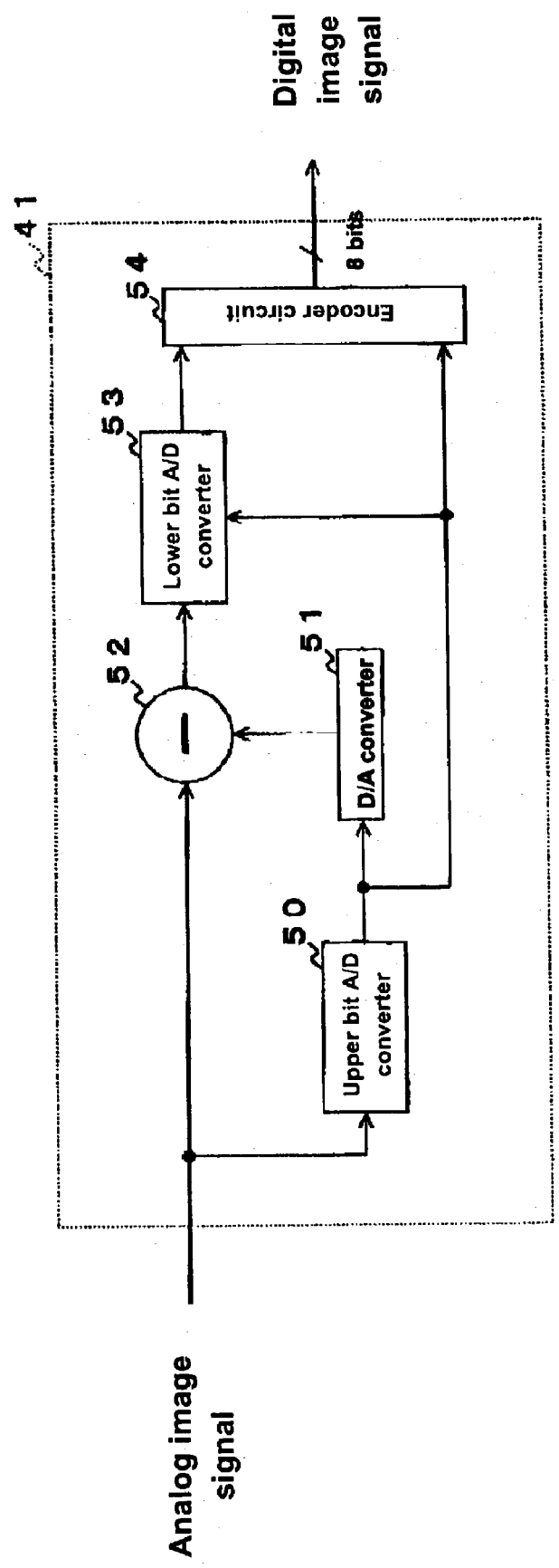
FIG. 8 shows a fourth specific example of a circuit structure of the non-linear conversion type A/D converter shown in FIG. 2.

FIG. 8 shows a fourth specific example of a circuit structure of the non-linear conversion type A/D converter 41. A flash type A/D converter has a little problem in that, although it operates at a high speed, it has a large circuit size because it handles many signal potentials that are to be resistance-divided, and has a large power consumption. The fourth specific example of a circuit structure of the non-linear conversion type A/D converter 41 shown in FIG. 8 is provided to solve such a problem.

As shown in FIG. 8, the non-linear conversion type A/D converter 41 includes an upper bit A/D converter 50, a D/A converter 51, a signal differential output circuit 52, a lower bit A/D converter 53 and an encoder 54.

The upper bit A/D converter 50 has a structure similar to that of the non-linear conversion type flash type A/D converter shown in FIG. 3, and outputs data of 3-bit width "000" when an analog image signal is $(V_B)$ V~$(V_B+\frac{1}{32} \cdot (V_T-V_B))$ V, outputs data of 3-bit width "001" when an analog image signal is $(V_B+\frac{1}{32} \cdot (V_T-V_B))$ V~$(V_B+\frac{1}{16} \cdot (V_T-V_B))$ V, outputs data of 3-bit width "010" when an analog image signal is $(V_B+\frac{1}{16} \cdot (V_T-V_B))$ V~$(V_B+\frac{3}{32} \cdot (V_T-V_B))$ V, and outputs data of 3-bit width "011" when an analog image signal is $(V_B+\frac{3}{32} \cdot (V_T-V_B))$ V~$(V_B+\frac{1}{8} \cdot (V_T-V_B))$ V.

Further, the upper bit A/D converter 50 outputs data of 3-bit width "100" when an analog image signal is $(V_B+\frac{1}{8} \cdot (V_T-V_B))$ V~$(V_B+\frac{3}{16} \cdot (V_T-V_B))$ V, outputs data of 3-bit width "101" when an analog image signal is $(V_B+\frac{3}{16} \cdot (V_T-V_B))$ V~$(V_B+\frac{1}{4} \cdot (V_T-V_B))$ V, outputs data of 3-bit width "110" when an analog image signal is $(V_B+\frac{1}{4} \cdot (V_T-V_B))$ V~$(V_B+\frac{1}{2} \cdot (V_T-V_B))$ V, and outputs data of 3-bit width "111" when an analog image signal is $(V_B+\frac{1}{2} \cdot (V_T-V_B))$ V~$(V_T)$ V. In other words, the upper bit A/D converter 50 divides $(V_B)$ V~$(V_T)$ V into eight areas, and determines in which of the eight areas an analog signal is located.

The D/A converter 51 outputs a signal of $(V_B)$ V when an output of the upper bit A/D converter 50 is "000", outputs a signal of $(V_B+\frac{1}{32} \cdot (V_T-V_B))$ V when an output of the upper bit A/D converter 50 is "001", outputs a signal of $(V_B+\frac{1}{16} \cdot (V_T-V_B))$ V when an output of the upper bit A/D converter 50 is "010", and outputs a signal of $(V_B+\frac{3}{32} \cdot (V_T-V_B))$ V when an output of the upper bit A/D converter 50 is "011". Also. the D/A converter 51 outputs a signal of $(V_B+\frac{1}{8} \cdot (V_T-V_B))$ V when an output of the upper bit A/D converter 50 is "100", outputs a signal of $(V_B+\frac{3}{16} \cdot (V_T-V_B))$ V when an output of the upper bit A/D converter 50 is "101", outputs a signal of $(V_B+\frac{1}{4} \cdot (V_T-V_B))$ V when an output of the upper bit A/D converter 50 is "110", and outputs a signal of $(V_B+\frac{1}{2} \cdot (V_T-V_B))$ V when an output of the upper bit A/D converter 50 is "111".

The signal differential output circuit 52 outputs a signal corresponding to a difference obtained by subtracting an output signal of the D/A converter 51 from an analog image signal.

The lower bit A/D converter 52 is a flash type linear A/D converter; and when an output of the upper bit A/D converter 50 is either "000", "001", "010" or "011", it compares potentials in 32 steps obtained by equally dividing ($\frac{1}{32} \cdot (V_T - V_B)$) V with an output signal of the signal differential output circuit 52, and linearly converts the output signal of the signal differential output circuit 52 into data of 5-bit width. Also, when an output of the upper bit A/D converter 50 is either "100" or "101", it compares potentials in 32 steps obtained by equally dividing ($\frac{1}{16} \cdot (V_T - V_B)$) V with an output signal of the signal differential output circuit 52, and linearly converts the output signal of the signal differential output circuit 52 into data of 5-bit width.

When an output of the upper bit A/D converter 50 is "110", the lower bit A/D converter 53 compares potentials in 32 steps obtained by equally dividing ($\frac{1}{4} \cdot (V_T - V_B)$) V with an output signal of the signal differential output circuit 52, and linearly converts the output signal of the signal differential output circuit 52 into data of 5-bit width. Also, when an output of the upper bit A/D converter 50 is "111", the lower bit A/D converter 53 compares potentials in 32 steps obtained by equally dividing ($\frac{1}{2} \cdot (V_T - V_B)$) V with an output signal of the signal differential output circuit 52, and linearly converts the output signal of the signal differential output circuit 52 into data of 5-bit width.

The encoder 54 outputs digital image data having an 8-bit data width including upper 3 bits output from the upper A/D converter 50 and lower 5 bits output from the lower bit A/D converter 53.

By this circuit structure, the non-linear conversion type A/D converter 41 shown in FIG. 8 has an A/D conversion characteristic indicated in FIG. 7.

The circuit structure of the non-linear conversion type A/D converter 41 shown in FIG. 8 is similar to the structure of a conventional serial-parallel A/D converter that performs linear A/D conversions. However, in the conventional serial-parallel A/D converter, an upper bit A/D converter linearly converts an analog image signal, and a lower bit A/D converter compares step potentials having a constant potential difference with an output signal of a signal differential output circuit without depending on an output of the upper bit A/D converter and linearly converts the output signal of the signal differential output circuit. Accordingly, the conventional serial-parallel type A/D converter has a linear A/D conversion characteristic. In contrast, in the non-linear conversion type A/D converter 41 shown in FIG. 8, the upper bit A/D converter 50 converts analog image signals in a polyline, and the lower bit A/D converter 53 compares step potentials in 32 steps having potential difference that change according to an output of the upper bit A/D converter 50 with an output signal of the signal differential output circuit 52, and linearly converts the output signal of the signal differential output circuit 52. Accordingly, the non-linear conversion type A/D converter 41 shown in FIG. 8 has an A/D conversion characteristic that assumes a polyline.

As described above, by the non-linear conversion type A/D converter 41 shown in FIG. 8, when digitizing an analog image signal, image gradation information data, which may otherwise be recorded in 10-bits in the conventional art, can be converted into digital image data having an 8-bit width and output while maintaining its dynamic range. Also, the bus width that outputs digital image data can be narrowed, a useful knee characteristic in recording image gradations can be realized, digital image data having a great dynamic range can be recorded with a small memory, and recording can be made while maintaining a dynamic range and accuracy necessary for digital image data.

Figure 9:
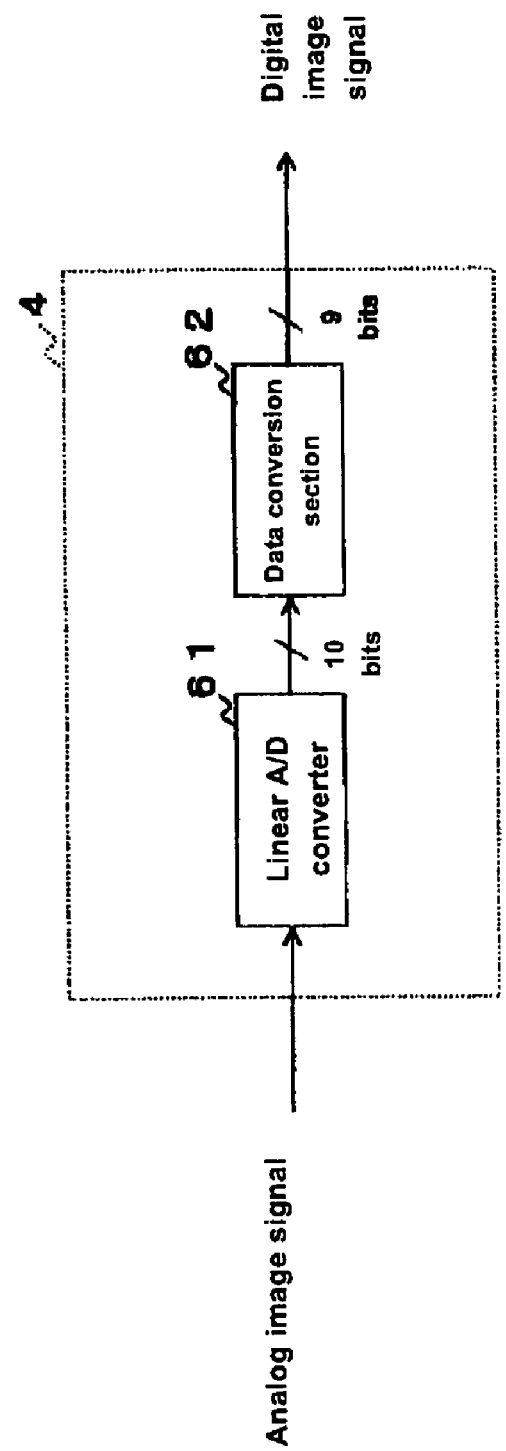
FIG. 9 shows an image signal processing circuit in accordance with a second embodiment of the present invention.

Next, an image signal processing circuit in accordance with a second embodiment of the present invention will be described. FIG. 9 shows an internal structure of the non-linear conversion type high-speed image signal conversion circuit 4 in FIG. 1 as the image signal processing circuit in accordance with the second embodiment of the present invention. As shown in FIG. 9, the non-linear conversion type high-speed image signal conversion circuit 4 is equipped with a linear A/D converter 61 and a data conversion section 62.

The linear A/D converter 61 receives an analog image signal, and outputs unsigned integer values of 10-bit width (digital image data). More specifically, the A/D converter 61 outputs zero (0) when it receives an analog image signal at ($V_B$) V, outputs 1023 when it receives an analog image signal at ($V_T$) V, and linearly outputs a value between 0 and 1023 according to a potential received when the received potential is between the two.

The data conversion section 62 receives digital data of 10-bit width from the linear A/D converter 61, and outputs unsigned integer values of 9-bit width (digital image data).

Figure 10:
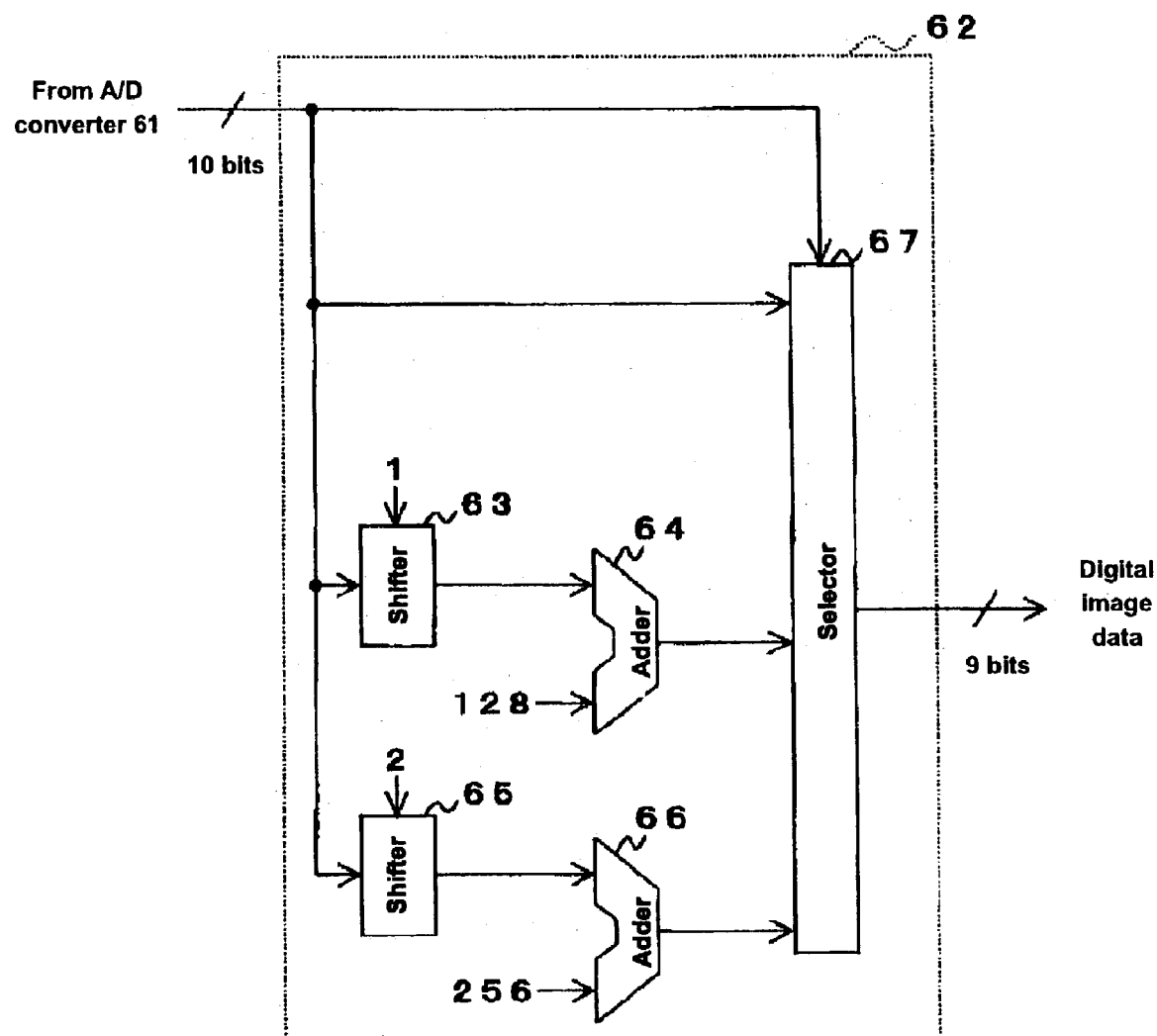
FIG. 10 shows an internal structure of a data conversion section shown in FIG. 9.

FIG. 10 shows an internal structure of the data conversion section 62. As shown in FIG. 10, the data conversion section 62 includes shifters 63 and 65, adders 64 and 66, and a selector 67.

The shifter 63 receives digital data of 10-bit width from the linear A/D converter 61, and outputs data of 9-bit width obtained by shifting the received digital data by one bit to the LSB side (which is equivalent to multiplying the same by 0.5).

The adder 64 outputs data of 9-bit width that is obtained by adding 128 to the data output from the shifter 63.

The shifter 65 receives digital data of 10-bit width from the linear A/D converter 61, and outputs data of 9-bit width obtained by shifting the received digital data by two bits to the LSB side (which is equivalent to multiplying the same by 0.25).

The adder 66 outputs data of 9-bit width that is obtained by adding 256 to the data output from the shifter 65.

When the digital data from the linear A/D converter 61 has a value x, the selector 67 selects and outputs lower 9 bits of the digital data from the linear A/D converter 61 when $0 \leq x \leq 255$, selects and outputs output data from the adder 64 when $256 \leq x \leq 511$, and selects and outputs output data from the adder 66 when $512 \leq x \leq 1023$.

Accordingly, when output data is y, and when $0 \leq x \leq 255$, the data conversion section 67 calculates y as follows:

$$y = x \ldots \quad (4)$$

When $256 \leq x \leq 511$, y is calculated as follows:

$$y = 0.5x + 128 \ldots \quad (5)$$

When $512 \leq x \leq 1023$, y is calculated as follows:

$$y = 0.25x + 256 \ldots \quad (6)$$

Figure 11:
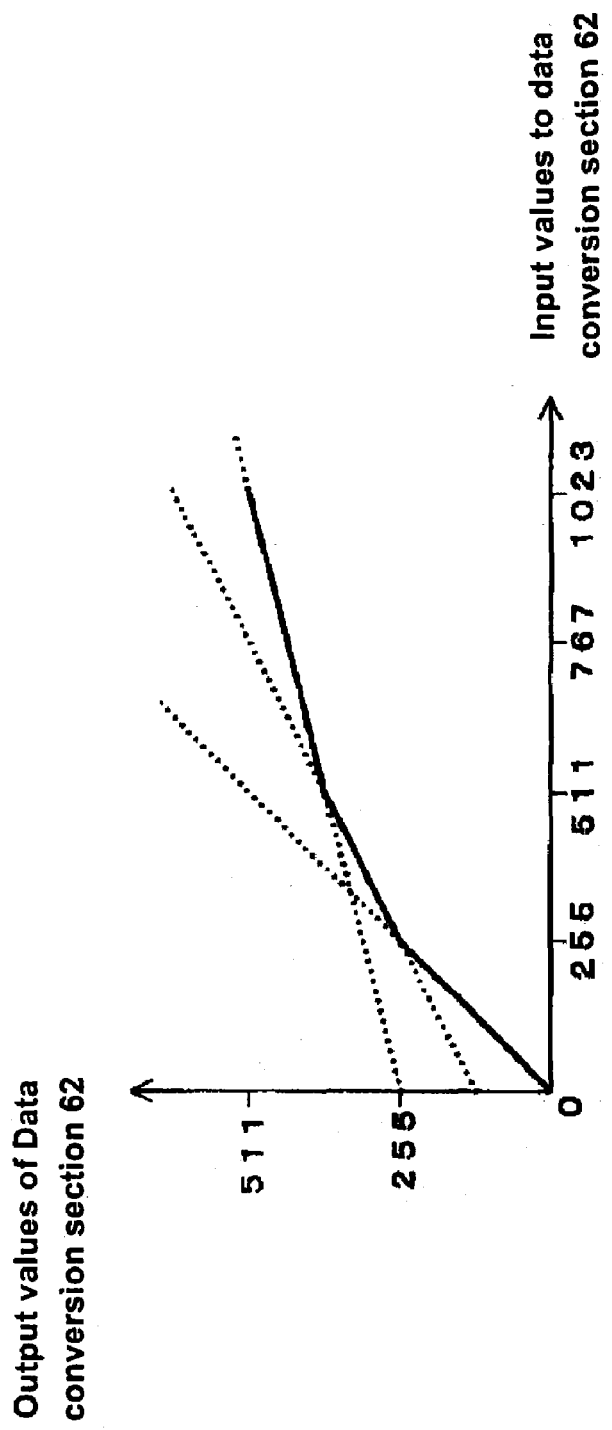
FIG. 11 shows a data conversion characteristic of the data conversion section shown in FIG. 9.

FIG. 11 shows relations between input values and output values (data conversion characteristic) given by the data conversion section 62. In FIG. 11, input values of the data conversion section 62 are indicated along a transverse axis, and output values of the data conversion section 62 are indicated along a vertical axis. It is noted that the data conversion characteristic of the data conversion section 62 reflects the human visibility characteristic in which the brightness is discriminated in proportion to the logarithm of the amount of light.

As described above, by the non-linear conversion type high-speed image signal processing circuit 4 shown in FIG. 9, when digitizing an analog image signal, image gradation information data, which may otherwise be recorded in 10-bits in the conventional art, can be converted into digital image data having a 9-bit width and output while maintaining its dynamic range. Also, the bus width that outputs digital image data can be narrowed, a useful knee characteristic in recording image gradations can be realized, digital image data having a great dynamic range can be recorded with a small memory, and recording can be made while maintaining a dynamic range and accuracy necessary for digital image data.

It is noted that in the present embodiment, the data conversion section 62 performs a data conversion through shift calculation and addition. However, it may perform a data conversion through multiplication or division and addition, and may perform a data conversion with an LUT (look-up table).

Also, in accordance with the present embodiment, the linear A/D converter 61 outputs digital data of 10-bit width, and the data conversion section 62 outputs digital data of 9-bit width. However, the linear A/D converter 61 may output digital data of 11-bit width, and the data conversion section 62 may output digital data of 10-bit width. In this case, digital image data of 10-bit width, which is the same as that of the conventional digital image photographing circuit 80, and having a dynamic range 2 times greater, can be output.

Figure 12:
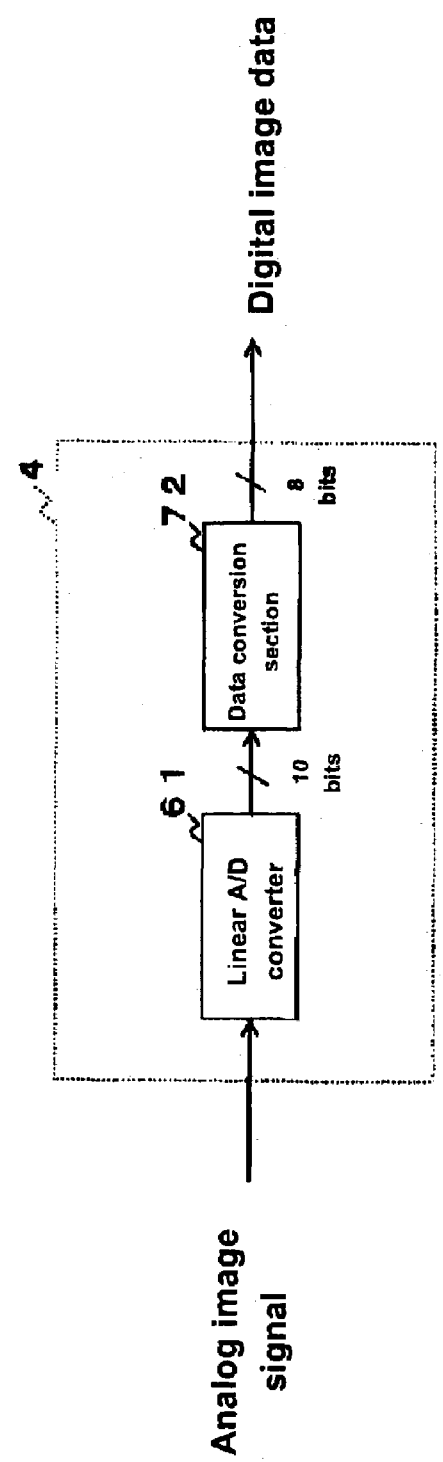
FIG. 12 shows an image signal processing circuit in accordance with a third embodiment of the present invention.

Next, an image signal processing circuit in accordance with a third embodiment of the present invention will be described. FIG. 12 shows an internal structure of the non-linear conversion type high-speed image signal conversion circuit 4 in FIG. 1 as the image signal processing circuit in accordance with the third embodiment of the present invention. As shown in FIG. 12, the non-linear conversion type high-speed image signal conversion circuit 4 is equipped with a linear A/D converter 61 and a data conversion section 72.

The data conversion section 72 receives digital data of 10-bit width from the linear A/D converter 61, and outputs unsigned integer values (digital image data) of 8-bit width.

Figure 13:
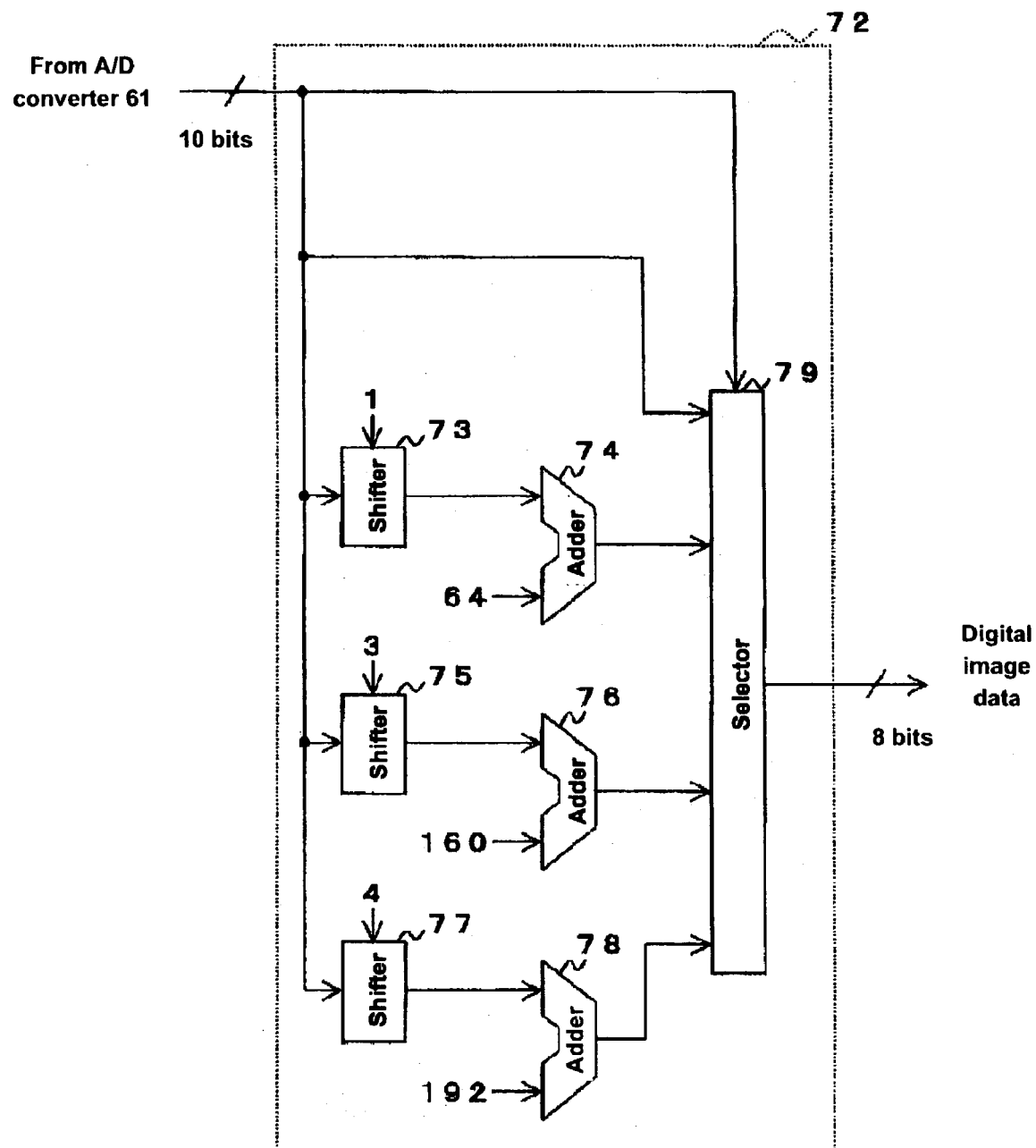
FIG. 13 shows an internal structure of a data conversion section shown in FIG. 12.

FIG. 13 shows an internal structure of the data conversion section 72. As shown in FIG. 13, the data conversion section 72 includes shifters 73, 75 and 77, adders 74, 76 and 78, and a selector 79.

The shifter 73 receives digital data of 10-bit width from the linear A/D converter 61, and outputs data of 8-bit width obtained by shifting the received digital data by one bit to the LSB side (which is equivalent to multiplying the same by 0.5).

The adder 74 outputs data of 8-bit width that is obtained by adding 64 to the data output from the shifter 73.

The shifter 75 receives digital data of 10-bit width from the linear A/D converter 61, and outputs data of 8-bit width obtained by shifting the received digital data by three bits to the LSB side (which is equivalent to multiplying the same by 0.125).

The adder 76 outputs data of 8-bit width that is obtained by adding 160 to the data output from the shifter 75.

The shifter 77 receives digital data of 10-bit width from the linear A/D converter 61, and outputs data of 8-bit width obtained by shifting the received digital data by four bits to the LSB side (which is equivalent to multiplying the same by 0.0625).

The adder 78 outputs data of 8-bit width that is obtained by adding 192 to the data output from the shifter 77.

When the digital data from the linear A/D converter 61 has a value x, the selector 79 selects and outputs lower 8 bits of the digital data from the linear A/D converter 61 when $0 \leq x \leq 127$, selects and outputs output data from the adder 74 when $128 \leq x \leq 255$, selects and outputs output data from the adder 76 when $256 \leq x \leq 511$, and selects and outputs output data from the adder 78 when $512 \leq x \leq 1023$.

Accordingly, when output data is y, and when $0 \leq x \leq 127$, the data conversion section 72 calculates y as follows:

$$y = x \ldots \quad (7)$$

When $128 \leq x \leq 255$, y is calculated as follows:

$$y = 0.5x + 64 \ldots \quad (8)$$

When $256 \leq x \leq 511$, y is calculated as follows:

$$y = 0.125x + 160 \ldots \quad (9)$$

When $512 \leq x \leq 1023$, y is calculated as follows:

$$y = 0.0625x + 192 \ldots \quad (10)$$

Figure 14:
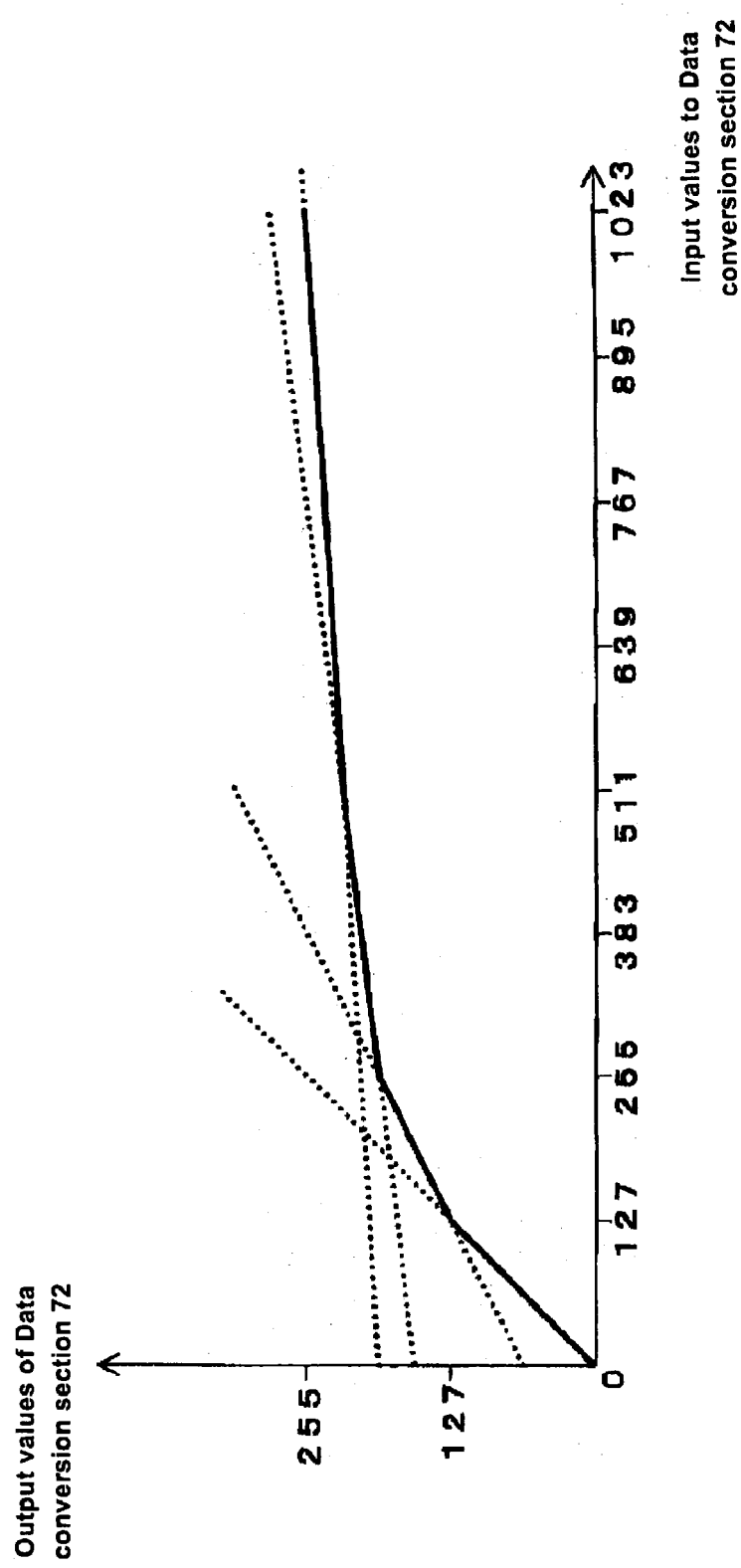
FIG. 14 shows a data conversion characteristic of the data conversion section shown in FIG. 12.
Figure 15:
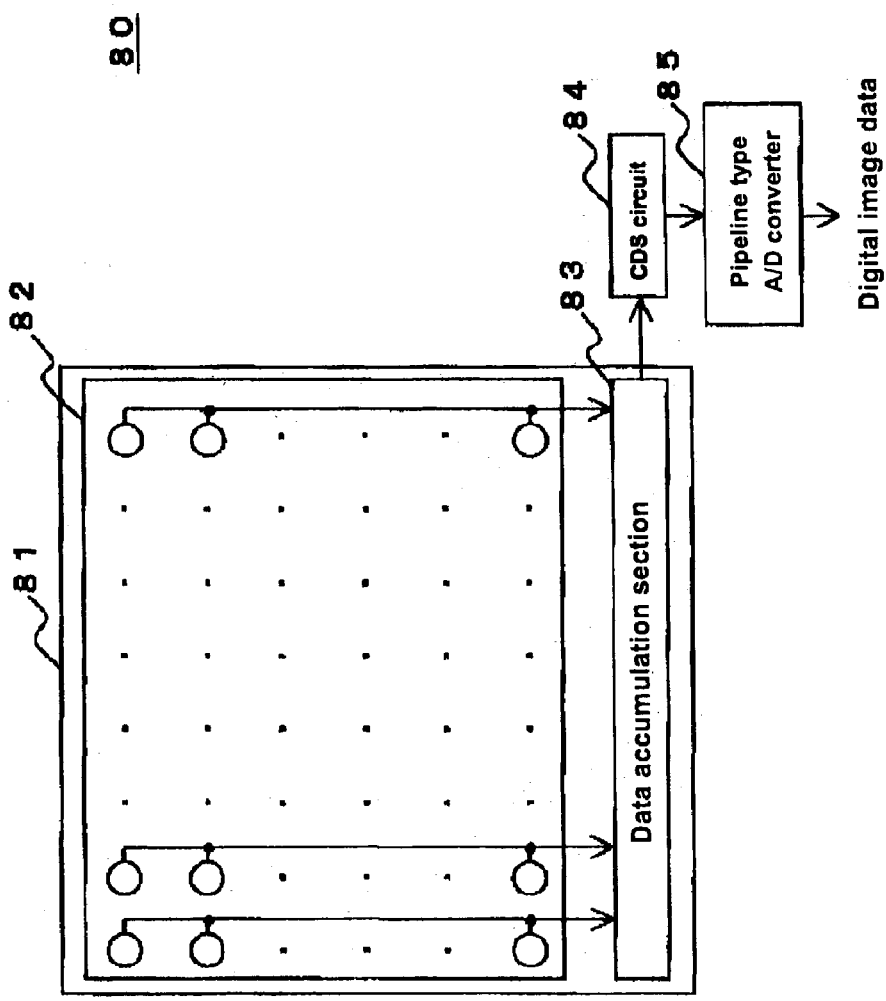
FIG. 15 shows a conventional digital image photographing circuit.
Figure 16:
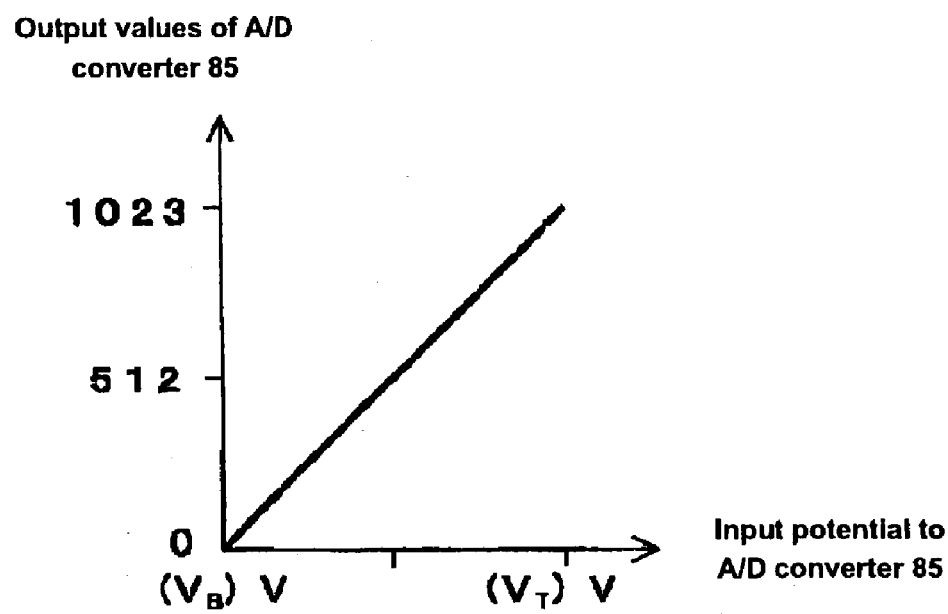
FIG. 16 shows a signal conversion characteristic of a pipeline type A/D converter shown in FIG. 15.
Figure 17:
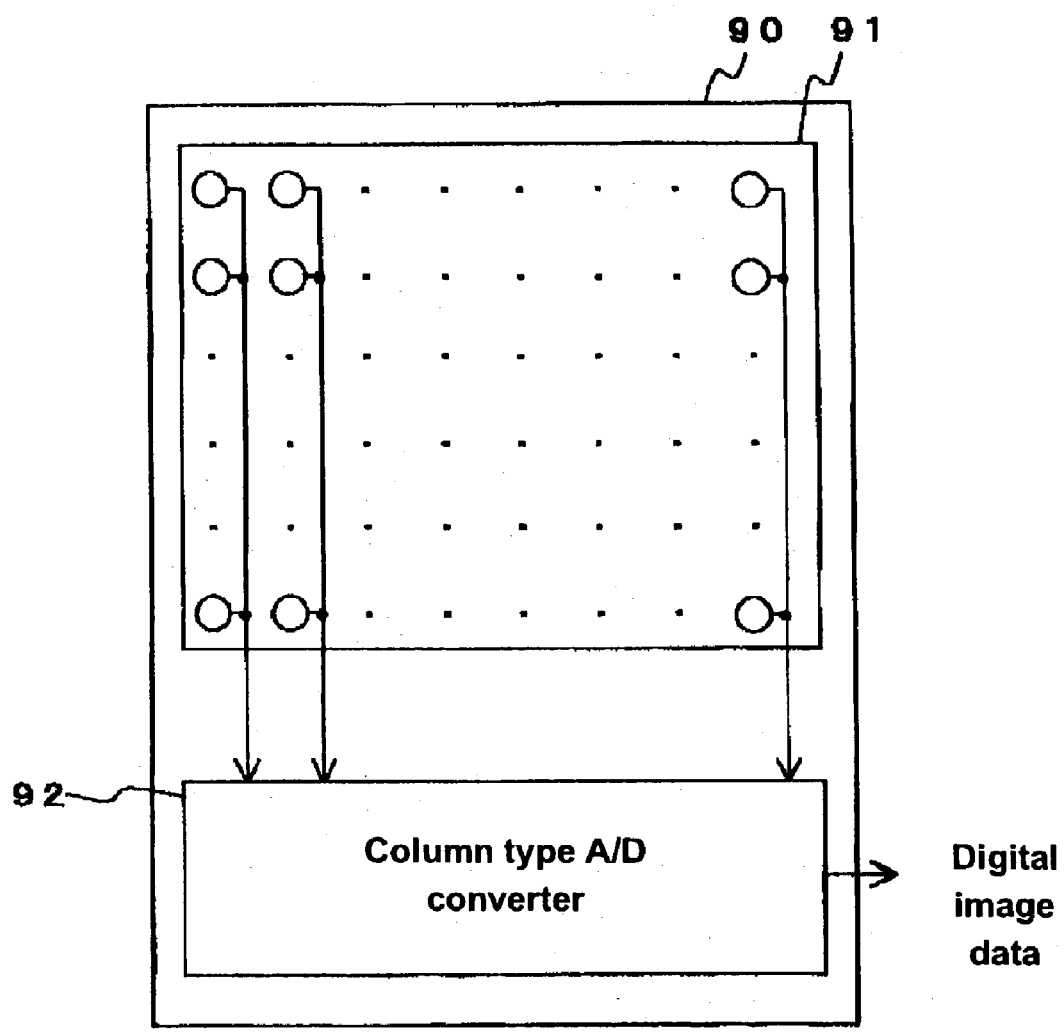
FIG. 17 shows an outline of a conventional semiconductor device.

FIG. 14 shows relations between input values and output values (data conversion characteristic) given by the data conversion section 72. In FIG. 14, input values of the data conversion section 72 are indicated along a transverse axis, and output values of the data conversion section 72 are indicated along a vertical axis. It is noted that the data conversion characteristic of the data conversion section 72 reflects the human visibility characteristic in which the brightness is discriminated in proportion to the logarithm of the amount of light.

As described above, by the non-linear conversion type high-speed image signal processing circuit 4 shown in FIG. 12, when digitizing and storing an analog image signal, image gradation information data, which may otherwise be recorded in 10-bits in the conventional art, can be converted into digital image data having an 8-bit width and output while maintaining its dynamic range. Also, by the non-linear conversion type high-speed image signal processing circuit 4 shown in FIG. 12, the bus width that outputs digital image data can be narrowed, a useful knee characteristic in recording image gradations can be realized, digital image data having a great dynamic range can be recorded with a small memory, and recording can be made while maintaining a dynamic range and accuracy necessary for digital image data. In general, RAMs are structures such that 8 bits are defined as one byte, and data is handled in units of bytes. Therefore, by compressing digital image data into 8-bit data, the design of peripheral circuits can be facilitated, and the cost of the entire system can be reduced.

It is noted that in the present embodiment, the data conversion section 72 performs a data conversion through shift calculation and addition. However, it may perform a data conversion through multiplication or division and addition, and may perform a data conversion with an LUT (look-up table).

Also, in accordance with the present embodiment, the linear A/D converter 61 outputs digital data of 10-bit width, and the data conversion section 72 outputs digital data of 8-bit width. However, the linear A/D converter 61 may output digital data of 12-bit width, and the data conversion section 72 may output digital data of 10-bit width. In this case, digital image data of 10-bit width, which is the same as that of the conventional digital image photographing circuit 80, and having a dynamic range 4 times greater, can be output.

As described above, the non-linear conversion type high-speed image signal processing circuit has several different structures. In particular, the first embodiment shows a non-linear conversion type high-speed image signal processing circuit that performs A/D conversion itself in a non-linear polyline, and the second and third embodiments show non-linear conversion type high-speed image signal processing circuits in which a data converter is added to a linear A/D converter.

In these embodiments described above, a non-linear conversion type high-speed image signal processing circuit that uses a circuit similar to a flash type A/D converter or a serial-parallel type A/D converter is described particularly in the first embodiment. No particular embodiment was described above as to a circuit that uses a pipeline type A/D converter which is generally used in recent years. However, a circuit structure having a polyline-like conversion characteristic may be similarly provided by using a pipeline type A/D converter.

Also, the second and third embodiments use linear A/D converters. The linear A/D converter in this case may be any one of flash type A/D converter, serial-parallel type A/D converter and pipeline type A/D converter.

When image data which is non-linearly compressed is processed, linear image processing can be performed in restoring the compressed data upon executing the image processing by decompressing the compressed data through a completely reverse procedure. In this case, a dedicated circuit may be used, or operations by software may be executed.

As described above, by using an image signal processing circuit in accordance with the present invention in a circuit that takes out an image, information data that is input in human vision, as digital image data, a dynamic range of gradations of the image is securely reserved according to the human visibility characteristic, image information having a required accuracy is maintained, and portions of relatively excessive accuracy in the image information are eliminated in advance, thereby very practically compressing the information. As a result, the bus width that outputs digital image data can be narrowed, digital image data having ample dynamic range and gradations can be recorded with a small memory, and the circuit can be reduced in size and simplified by the effects described above, which results in a substantial cost reduction. Also, by a semiconductor device in accordance with the present invention, the bus width that outputs digital image data can be narrowed, digital image data having ample dynamic range and gradations can be recorded with a small memory, and the circuit can be reduced in size and simplified by the effects described above, which results in a substantial cost reduction.

Also, a useful knee effect can be readily realized for image data by the compression effects on the image data.

Also, in recent years, image data with an accuracy in the order of about 10 bits or even an accuracy in the order of 12 bits may be required in order to reserve a dynamic range of gradations of images in digital still cameras, and therefore more accurate and expensive A/D converters are required. It is extremely difficult to compose A/D converters that are highly accurate, reserve linearity, are stable, operate at high speeds and achieve lower power consumption. In addition, their circuit size is large and high circuit accuracy is required, and their cost is high. In accordance with the present invention, the accuracy of dark parts can be finely created, the accuracy of light parts can be roughly created, unnecessary accuracy does not need to be retained for A/D converters, and the circuit size can be reduced. As a result, the cost can be reduced, a lower power consumption can be achieved, and therefore highly functional A/D conversion functions can be readily developed.

Moreover, the present invention brings about substantial effects. For example, data having a dynamic range that may conventionally require 10 bits can be recorded in 8 bits, and data of 12 bits can be recorded in 10 bits or 8 bits, such that the memory capacity for storing image data sent from a sensor can be substantially reduced, and the cost of an image processing circuit that is connected to an image signal processing circuit of the present invention can be substantially reduced.

Furthermore, in an image signal processing circuit in accordance with the present invention, a method for compressing image data is realized through a non-linear characteristic in a polyline composed of a combination of linear segments, and not through a non-linear characteristic in the form of a parabolic curve or an exponential curve. It is therefore effective because the performance, accuracy, stability and circuit design for A/D converters can be readily developed. Also, even when a conventional linear A/D converter is used, a polyline-type non-linear image signal processing circuit can be created with an extremely simple data conversion circuit, and therefore the cost can be reduced.

Furthermore, compressed data may be restored into linear data according to the aforementioned conversion method in an image processing circuit of a digital still camera or the like that is connected to the image signal processing circuit in accordance with the present invention. In such a case, the restoration circuit may be a polyline type, which can be composed by a reverse conversion circuit of any of the circuits indicated in the first through third embodiments. It is therefore effective because data can be restored with a simple circuit and/or by a software processing.

The entire disclosure of Japanese Patent Application No. 2002-053131 filed Feb. 28, 2002 is incorporated by reference.

What is claimed is:

1. An image signal processing circuit that converts an analog image signal to digital image data having values that change in a polyline with respect to changes in the analog image signal, the image signal processing circuit comprising:
   an upper bit A/D converter that generates an upper bit digital signal indicating a section of the polyline corresponding to the analog image signal;
   a D/A converter that converts the upper bit digital signal to an upper bit analog signal;
   a signal differential output circuit that subtracts the upper bit analog signal from the analog image signal to generate a lower bit analog signal;
   a lower bit A/D converter that receives the lower bit analog signal and the upper bit digital signal, and that converts the lower bit analog signal to a lower bit digital signal by comparing the lower bit analog signal with step potentials having potential differences determined by the upper bit digital signal, the step potentials increasing as the upper bit digital signal increases; and
   an encoder circuit that generates the digital image data by combining the upper bit digital signal and the lower bit digital signal.

2. An image signal processing circuit that converts an analog image signal to a digital image data, the image signal processing circuit comprising:

an A/D conversion section that outputs, in response to an analog image signal, first digital data of i-bit (i is a natural number) width having a value that linearly changes with respect to changes in the analog image signal; and a data conversion section that outputs, in response to the first digital data, second digital data of j-bit (j is a natural number that is less than i) width which changes in a polyline with respect to changes in the first digital data, the data conversion section including:

a first shifter that outputs first shifted data resulting from shifting the first digital data by one bit in a least significant bit direction;

a first adder that outputs first addition data resulting from adding a first predetermined amount to the first shifted data;

a second shifter that outputs second shifted data resulting from shifting the first digital data by two bits in the least significant bit direction;

a second adder that outputs second addition data resulting from adding a second predetermined amount to the second shifted data; and a selector that compares the first digital data with the first and second predetermined amounts and that outputs the second digital data based on the comparison;

wherein the second digital data corresponds to the least significant j-bits of the first digital data when the first digital data is less than the first predetermined amount, to the first addition data when the first digital data is greater than the first predetermined amount and less than the second predetermined amount, and to the second addition data when the first digital data is greater than the second predetermined amount.

3. The image signal processing circuit according to claim 2, wherein the first digital data has a width of 8 to 16 bits, and the second digital data has a width of 7 to 12 bits.

4. The image signal processing circuit according to claim 2, wherein a rate of changes of the second digital data with respect to changes of the first digital data is expressed by $\frac{1}{2}^K$ (k is a natural number).

5. A semiconductor device that photographs an image and outputs digital image data, the semiconductor device comprising:

an area sensor having a plurality of image sensors that each output an analog image signal according to an amount of light received; and the image signal processing circuit set forth in claim 3 that converts an analog image signal to digital image data.

6. The semiconductor device according to claim 5, wherein the image sensors are formed on a common chip by a CMOS type manufacturing process.

7. The semiconductor device according to claim 5, wherein the image sensors are disposed in a matrix configuration.

8. A semiconductor device that photographs an image and outputs digital image data, the semiconductor device comprising:

an area sensor having a plurality of image sensors that each output an analog image signal according to an amount of light received; and the image signal processing circuit set forth in claim 1 that converts an analog image signal to digital image data.

9. A semiconductor device according to claim 8, wherein the image sensors are formed on a common chip by a CMOS type manufacturing process.

10. A semiconductor device according to claim 8, wherein the image sensors are disposed in a matrix configuration.

* * * * *